(12) United States Patent
Zheng et al.

(10) Patent No.: US 12,156,152 B2
(45) Date of Patent: Nov. 26, 2024

(54) METHOD AND APPARATUS FOR TRANSMITTING TIMING DIFFERENCE

(71) Applicant: Huawei Technologies Co., Ltd., Shenzhen (CN)

(72) Inventors: Lili Zheng, Shanghai (CN); Hongping Zhang, Shenzhen (CN); Qinghai Zeng, Shanghai (CN); Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 17/669,856

(22) Filed: Feb. 11, 2022

(65) Prior Publication Data

US 2022/0167294 A1    May 26, 2022

Related U.S. Application Data

(63) Continuation of application No. PCT/CN2020/108921, filed on Aug. 13, 2020.

(30) Foreign Application Priority Data

Aug. 14, 2019    (CN) .......................... 201910750482.5

(51) Int. Cl.
*H04W 56/00* (2009.01)
*H04W 24/10* (2009.01)
*H04W 48/08* (2009.01)

(52) U.S. Cl.
CPC ....... *H04W 56/0015* (2013.01); *H04W 24/10* (2013.01); *H04W 48/08* (2013.01)

(58) Field of Classification Search
CPC .. H04W 56/0015; H04W 24/10; H04W 48/08

(Continued)

(56) References Cited

U.S. PATENT DOCUMENTS

| | | |
|---|---|---|
| 10,917,866 B2 | 2/2021 | Zhang et al. |
| 11,190,613 B2 | 11/2021 | Dai et al. |

(Continued)

FOREIGN PATENT DOCUMENTS

| | | | |
|---|---|---|---|
| CA | 3060836 A1 * | 5/2020 | .......... H04W 72/042 |
| CN | 104581854 A | 4/2015 | |

(Continued)

OTHER PUBLICATIONS

"SFTD/SSTD Measurements for NR-NR DC," Agenda Item: 11.10.2, Source: Huawei, HiSilicon, Document for: Discussion and Decision, 3GPP TSG-RAN WG2 #105, R2-1901619, Athens, Greece, Feb. 25-Mar. 1, 2019, 3 pages.

(Continued)

*Primary Examiner* — Ted M Wang
(74) *Attorney, Agent, or Firm* — SLATER MATSIL, LLP

(57) ABSTRACT

A method and an apparatus for transmitting a timing difference. The method includes obtaining, by a master node, a measurement value of a timing difference between a first cell and a second cell, and sending, by the master node, the measurement value of the timing difference and identification information of the second cell to a secondary node, where the first cell is a primary cell corresponding to the master node, the second cell includes a primary secondary cell corresponding to the secondary node or another cell different from the primary secondary cell, and the identification information of the second cell includes a physical cell identifier (PCI) and frequency information of the second cell.

17 Claims, 5 Drawing Sheets

(58) Field of Classification Search
USPC .......................................................... 455/422
See application file for complete search history.

(56) References Cited

U.S. PATENT DOCUMENTS

| | | | | |
|---|---|---|---|---|
| 2016/0183314 | A1* | 6/2016 | Tsuboi | H04W 8/20 |
| | | | | 455/450 |
| 2016/0218821 | A1 | 7/2016 | Adhikary et al. | |
| 2018/0014229 | A1 | 1/2018 | Chiba et al. | |
| 2019/0253908 | A1 | 8/2019 | Fan et al. | |

FOREIGN PATENT DOCUMENTS

| | | |
|---|---|---|
| CN | 105451340 A | 3/2016 |
| CN | 108990080 A | 12/2018 |
| CN | 109274475 A | 1/2019 |
| CN | 109644521 A | 4/2019 |
| WO | 2018228560 A1 | 12/2018 |
| WO | 2019137413 A1 | 7/2019 |

OTHER PUBLICATIONS

"SFTD Measurement Information in CG-ConfigInfo," Source to WG: Huawei, HiSilicon, Source to TSG: R2, Work Item Code: NR_newRAT-Core, Category: F, Date: Aug. 26, 2019, Release: Rel-15, Change Request 38.331, CR 1234, rev-Current Version: 15.6.0, 3GPP TSG-RAN WG2 #107, R2-1910933, Aug. 26-30, 2019, 8 pages.

"SSTD Design in EN-DC," Agenda Item: 10.4.2.2, Source: MediaTek Inc., Document for: Discussion and Decision, 3GPP TSG-RAN WG2 Meeting AH-1801, R2-1800972, Vancouver, Canada, Jan. 22-26, 2018, 30 pages.

"[M006] Capability for SFTD in NR-DC and NE-DC," Source to WG: MediaTek Inc . . . , Source to TSG: R2, Work item code: NR_newRAT-Core, Date: May 13, 2019, Category: F, Release: Rel-15, Change Request 38.306, CR 0117, rev, Current version:15. 5.0, O3GPP TSG-RAN WG2 Meeting #106, R2-1906684, Reno, Nevada, USA, May 13-17, 2019, 5 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.6.0, Jun. 2019, 365 pages.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.6.0, Jun. 2019, 960 pages.

"3rd Generation Partnership Project; Technical Specification Group Radio Access Network; Evolved Universal Terrestrial Radio Access Network (E-UTRAN); X2 application protocol (X2AP) (Release 15)," 3GPP TS 36.423 V15.6.0, Jul. 2019, 421 pages.

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.6.0, Jun. 2019, 69 pages.

"3rd Generation Partnership Project; Technical Specification Group Radio Access Network; NR; NR and NG-RAN Overall Description; Stage 2 (Release 15)," Jun. 2019, 3GPP TS 38.300 V15.6.0, 99 pages.

"3rd Generation Partnership Project; Technical Specification Group Radio Access Network; NG-RAN; Xn application protocol (XnAP)(Release 15)," 3GPP TS 38.423 V15.4.0, Jul. 2019, 309 pages.

"Configuration of CGI Reporting," Agenda Item: 10.4.1.4.6, Source: Ericsson, Document for: Discussion, Decision, 3GPP TSG-RAN WG2 #102, R2-1807251, Busan, S. Korea, May 21-25, 2018 (Resubmission of R2-1806159), 2 pages.

"Inter-RAT SFTD Measurement for EN-DC when PSCell is Not Configured," Source: NTT Docomo, Inc., Agenda Item:7.9.4.4, Document for: Discussion, 3GPP TSG-RAN WG4 Meeting #86, R4-1802515, Athens, Greece, Feb. 26-Mar. 2, 2018, 2 pages.

"3rd Generation Partnership Project; Technical Specification Group Radio Access Network; NR; Radio Resource Control (RRC) Protocol Specification (Release 15)," 3GPP TS 38.331 V15.6.0, Jun. 2019, 519 pages.

"CR on MN/SN coordination for report CGI procedure," Source to TSG: Nokia, Nokia Shanghai Bell, Ericsson, Huawei, HiSillicon, Intel, Work item code: NR_newRAT-Core, Date: Dec. 13, 2018, Category: F, Release: Rel-15, Change Request, 38.331, CR 0620, rev 3, Current Version: 15/3/0, 3GPP TSG-RAN Meeting #82, RP-182840, Sorrento, Italy, Dec. 10-13, 2018, 14 pages.

* cited by examiner

METHOD AND APPARATUS FOR TRANSMITTING TIMING DIFFERENCE

CROSS-REFERENCE TO RELATED APPLICATIONS

This application is a continuation of International Application No. PCT/CN2020/108921, filed on Aug. 13, 2020, which claims priority to Chinese Patent Application No. 201910750482.5, filed on Aug. 14, 2019. The disclosures of the aforementioned applications are hereby incorporated by reference in their entireties.

TECHNICAL FIELD

This application relates to the communications field, and specifically, to a method and an apparatus for transmitting a timing difference.

BACKGROUND

A dual-connectivity (DC) technology indicates that a terminal device may establish radio links with two base stations. The two base stations include one master station, and the other base station is a secondary station. The master station may configure a terminal device to measure a timing difference between cells and send a measurement result of the timing difference to the secondary station. For example, the timing difference is a system frame number and frame timing difference (system frame number (SFN) and frame timing difference (SFTD)).

In the current technology, a method for sending, by the master station, a measurement result of a timing difference to the secondary station is: sending, to the secondary station, the timing difference and a physical cell identifier (PCI) of a cell corresponding to the timing difference.

When the master station sends measurement results of a plurality of timing differences to the secondary station, in an existing method, the secondary station, as a receive end, may not able to correctly identify a cell corresponding to each of the plurality of timing differences.

SUMMARY

This application provides a method and an apparatus for transmitting a timing difference, to enable a secondary node to accurately identify a cell corresponding to an SFTD in a dual-connectivity communication scenario to some extent.

A first aspect provides a method for transmitting a timing difference. The method is implemented by a network device that can serve as a master node, or implemented by a chip or circuit configured in the network device. The method includes: A master node obtains a measurement value of a timing difference between a first cell and a second cell, and the master node sends the measurement value of the timing difference and identification information of the second cell to a secondary node, where the first cell is a primary cell of the master node, and the second cell is a primary secondary cell of the secondary node, or the second cell is another cell, and the identification information of the second cell includes a physical cell identifier (PCI) and frequency information of the second cell, or the identification information of the second cell includes a cell global identifier (CGI) of the second cell.

In this application, the master node sends the timing difference between the first cell and the second cell and the PCI and frequency information of the second cell to the secondary node, so that the secondary node can identify the second cell corresponding to the timing difference to some extent. Alternatively, the master node sends the timing difference between the first cell and the second cell and the CGI of the second cell to the secondary node, so that the secondary node can identify the second cell corresponding to the timing difference.

In this application, the master node sends the timing difference between the cells and identification information of a cell corresponding to the timing difference to the secondary node, so that the secondary node can identify the cell corresponding to the timing difference to some extent.

A second aspect provides a method for transmitting a timing difference. The method is implemented by a network device that can serve as a secondary node, or implemented by a chip or circuit configured in the network device. The method includes: A secondary node receives a measurement value of a timing difference between a first cell and a second cell and identification information of the second cell from a master node, and the secondary node obtains the timing difference between the first cell and the second cell, where the first cell is a primary cell of the master node, and the second cell is a primary secondary cell of the secondary node, or the second cell is another cell, and identification information of the second cell includes a PCI and frequency information, or the identification information of the second cell includes a CGI of the second cell.

In this application, the master node sends the timing difference between the cells and identification information of a cell corresponding to the timing difference to the secondary node, so that the secondary node can identify the cell corresponding to the timing difference to some extent.

In the first aspect or the second aspect, for example, the timing difference is a system frame number and frame timing difference (system frame number (SFN) and frame timing difference (SFTD)).

It should be understood that after obtaining the SFTD between the first cell and the second cell, the secondary node (or the master node) may perform related processing based on the SFTD. For example, the SFTD may be used for the purpose of discontinuous reception (DRX) alignment or identification of a measurement gap.

With reference to the first aspect or the second aspect, in some possible implementations, the measurement value of the timing difference and the identification information of the second cell are carried in a same information element.

With reference to the first aspect or the second aspect, in some possible implementations, when the identification information of the second cell includes the physical cell identifier (PCI) and the frequency information of the second cell, the measurement value of the timing difference and the PCI of the second cell are carried in a first information element, and the frequency information of the second cell is carried in a second information element. A location of the frequency information of the second cell in the second information element is in a one-to-one correspondence with a location of the measurement value of the timing difference or the PCI of the second cell in the first information element.

That the location of the frequency information of the second cell in the second information element is in a one-to-one correspondence with the location of the measurement value of the SFTD in the first information element indicates that the location of the frequency information of the second cell corresponding to the SFTD in the second information element may be determined based on the location of the measurement value of the SFTD in the first information element, or the location of the measurement value of the SFTD corresponding to the second cell in the first information element may be determined based on the location of the frequency information of the second cell in the second information element.

It may be understood that although the measurement value of the SFTD between the first cell and the second cell and the PCI of the second cell are carried in an information element different from an information element in which the frequency information of the second cell is carried, the measurement value of the SFTD between the first cell and the second cell and the PCI of the second cell have a correspondence with the frequency information of the second cell.

It should be understood that, after receiving the first information element and the second information element that are sent by the master node, the secondary node may learn that frequency information of a specific cell in the second information element corresponds to a measurement value of a specific SFTD in the first information element.

With reference to the first aspect or the second aspect, in some possible implementations, when the identification information of the second cell includes the cell global identifier CGI of the second cell, the measurement value of the timing difference is carried in the first information element, and the CGI of the second cell is carried in the second information element. A location of the CGI of the second cell in the second information element is in a one-to-one correspondence with a location of the measurement value of the timing difference in the first information element.

That the location of the CGI of the second cell in the second information element is in a one-to-one correspondence with the location of the measurement value of the SFTD in the first information element indicates that the location of the CGI of the second cell corresponding to the SFTD in the second information element may be determined based on the location of the measurement value of the SFTD in the first information element, or the location of the measurement value of the SFTD corresponding to the second cell in the first information element may be determined based on the location of the CGI of the second cell in the second information element.

It may be understood that although the measurement value of the SFTD between the first cell and the second cell and the PCI of the second cell are carried in an information element different from an information element in which the CGI of the second cell is carried, the measurement value of the SFTD between the first cell and the second cell and the PCI of the second cell have a correspondence with the CGI of the second cell.

It should be understood that, after receiving the first information element and the second information element that are sent by the master node, the secondary node may learn that a CGI of a cell in the second information element corresponds to a measurement value of an SFTD in the first information element.

With reference to the first aspect or the second aspect, in some possible implementations, that the master node sends a measurement value of a timing difference and identification information of a second cell to a secondary node includes: The master node sends SFTDs between the first cell and a plurality of second cells and identification information of each second cell to the secondary node. The identification information of each second cell includes a PCI and frequency information of the cell, or a CGI of the cell. The measurement value of each SFTD and the identification information of the second cell may be carried in a same information element, or at least some information in the identification information of the second cell and the measurement value of the SFTD may be carried in different information elements.

When at least some information in the identification information of the second cell and the measurement value of the SFTD are carried in different information elements, a location of the at least some information in the identification information of the second cell in a corresponding information element correspond to a location of the measurement value of the SFTD in a corresponding information element, that is, the location of the measurement value of the SFTD in the corresponding information element is in a one-to-one correspondence with the location of the identification information of the second cell corresponding to the SFTD in the corresponding information element.

Based on the foregoing description, in the method provided in the first aspect or the second aspect, the master node sends a timing difference between cells and identification information of a cell (non-primary cell) corresponding to the timing difference to the secondary node, so that the secondary node can identify the cell (non-primary cell) corresponding to the timing difference.

This application further provides a method for measuring a timing difference. In the method, a secondary node negotiates with a master node to configure timing difference measurement of a terminal device, to ensure that the terminal device performs one timing difference measurement task in a same period of time.

The secondary node may negotiate with the master node in a plurality of manners as long as the terminal device can perform only one timing difference measurement task in a same period of time.

A third aspect, a fourth aspect, and a fifth aspect are described below from perspectives of a secondary node, a master node, and a terminal device.

The third aspect provides a method for measuring a timing difference. The method is implemented by a network device that can serve as a secondary node, or implemented by a chip or circuit configured in the network device. The method includes: A secondary node determines to configure a terminal device to measure a timing difference between cells, and the secondary node configures, when a master node consents, the terminal device to measure the timing difference.

For example, the timing difference is an SFTD.

In this application, the secondary node may configure the terminal device to measure the timing difference between the cells.

In addition, the secondary node configures the terminal device to measure the timing difference in a manner of negotiating with the master node. The secondary node configures, when the master node consents, the terminal device to measure the timing difference between the cells. Therefore, in this application, in a dual-connectivity scenario, the master node and the secondary node can configure, in a negotiation manner, the terminal device to measure the SFTD, so that an SFTD measurement task configured for the terminal device can be prevented from exceeding a capability of the terminal device.

With reference to the third aspect, in some possible implementations of the third aspect, the method further includes: The secondary node sends a request message to the master node, to request to configure the terminal device to measure the timing difference between the cells. That the secondary node configures, when the master node consents, the terminal device to measure the timing difference includes: When a response message that is sent by the master node and that is used to indicate consent to the configuring is received, the secondary node configures the terminal device to measure the timing difference, or when a response message that is sent by the master node for the request message is not received, the secondary node configures the terminal device to measure the timing difference.

With reference to the third aspect, in some possible implementations of the third aspect, the request message further carries measurement configuration information of the timing difference, and the measurement configuration information of the timing difference includes identification information of cells corresponding to the timing difference. The method further includes: When receiving information sent by the master node and used to indicate a measurement result of the timing difference, the secondary node does not configure the terminal device to measure the timing difference.

With reference to the third aspect, in some possible implementations of the third aspect, the cells corresponding to the timing difference include a primary secondary cell of the secondary node and another cell. The information sent by the master node and used to indicate the measurement result of the timing difference includes: a timing difference between the primary cell and the another cell, or a timing difference between the primary secondary cell and the another cell.

With reference to the third aspect, in some possible implementations of the third aspect, the identification information of each cell corresponding to the timing difference includes a PCI and frequency information of the cell, or a CGI of the cell.

The fourth aspect provides a method for measuring a timing difference. The method is implemented by a network device that can serve as a master node, or implemented by a chip or circuit configured in the network device. The method includes: The master node negotiates with a secondary node to configure timing difference measurement of a terminal device, to ensure that the terminal device performs one timing difference measurement task in a same period of time.

The master node may negotiate with the secondary node in a plurality of manners as long as the terminal device can perform only one timing difference measurement task in a same period of time.

With reference to the fourth aspect, in some possible implementations of the fourth aspect, that the master node negotiates with the secondary node to configure timing difference measurement for a terminal device includes: The master node receives a request message from the secondary node, where the request message is used to request the secondary node to configure the terminal device to measure the timing difference between the cells, and the master node sends a response message used to indicate consent or dissent to the configuring to the secondary node.

For example, the timing difference is an SFTD.

In this application, the secondary node may configure the terminal device to measure the timing difference between the cells.

In addition, the secondary node configures the terminal device to measure the timing difference in a manner of negotiating with the master node. The secondary node configures, when the master node consents, the terminal device to measure the timing difference between the cells. Therefore, in this application, in a dual-connectivity scenario, the master node and the secondary node can configure, in a negotiation manner, the terminal device to measure the SFTD, so that an SFTD measurement task configured for the terminal device can be prevented from exceeding a capability of the terminal device.

With reference to the fourth aspect, in some possible implementations of the fourth aspect, the request message further carries measurement configuration information of the timing difference, and the measurement configuration information of the timing difference includes identification information of cells corresponding to the timing difference. The method further includes: The master node sends information used to indicate a measurement result of the timing difference to the secondary node, to express dissent to configuring, by the secondary node, the terminal device to measure the timing difference.

With reference to the fourth aspect, in some possible implementations of the fourth aspect, the cells corresponding to the timing difference include a primary secondary cell of the secondary node and another cell. The information sent by the master node and used to indicate the measurement result of the timing difference includes: a timing difference between the primary cell and the another cell, or a timing difference between the primary secondary cell and the another cell.

With reference to the fourth aspect, in some possible implementations of the fourth aspect, the identification information of each cell corresponding to the timing difference includes a PCI and frequency information of the cell, or a CGI of the cell.

Based on the foregoing description, in the method provided in the third aspect or the fourth aspect, in a dual-connectivity scenario, the master node and the secondary node can configure, in a negotiation manner, the terminal device to measure the SFTD, so that an SFTD measurement task configured for the terminal device can be prevented from exceeding the capability of the terminal device.

The fifth aspect provides a method for measuring a timing difference. The method may be implemented by a terminal device, or implemented by a chip or circuit configured in the terminal device. The method includes: receiving first measurement configuration information of a timing difference between cells from a master node, receiving second measurement configuration information of the timing difference between cells from a secondary node, and measuring the timing difference between cells based on the first measurement configuration information and/or the second measurement configuration information.

For example, the timing difference is an SFTD.

In this application, an SFTD measurement task configured for the terminal device can be prevented from exceeding a capability of the terminal device.

With reference to the fifth aspect, in some possible implementations of the fifth aspect, the measuring the timing difference between the cells based on the first measurement configuration information and/or the second measurement configuration information includes: measuring the timing difference between the cells based on the first measurement configuration information, measuring the timing difference between the cells based on the second measurement configuration information, after the measuring the timing difference between the cells based on the first measurement configuration information is completed, measuring the timing difference between the cells based on the second measurement configuration information, or after the measuring the timing difference between the cells based on the second measurement configuration information is completed, measuring the timing difference between the cells based on the first measurement configuration information.

Based on the foregoing description, the method provided in the fifth aspect can prevent an SFTD measurement task configured for the terminal device from exceeding the capability of the terminal device.

A sixth aspect provides a communications apparatus. The communications apparatus may be configured to perform the method in the first aspect, the second aspect, the third aspect, the fourth aspect, or the fifth aspect.

Optionally, the communications apparatus may include a module configured to perform the method in the first aspect, the second aspect, the third aspect, the fourth aspect, or the fifth aspect.

A seventh aspect provides a communications apparatus. The communications apparatus includes a processor. The processor is coupled to a memory. The memory is configured to store a computer program or instructions, and the processor is configured to execute the computer program or the instructions stored in the memory, so that the method in the first aspect, the second aspect, the third aspect, the fourth aspect, or the fifth aspect is performed.

For example, the processor is configured to execute the computer program or the instructions stored in the memory, so that the communications apparatus is enabled to perform the method in the first aspect, the second aspect, the third aspect, the fourth aspect, or the fifth aspect.

Optionally, the communications apparatus includes one or more processors.

Optionally, the communications apparatus may further include the memory coupled to the processor.

Optionally, the communications apparatus may include one or more memories.

Optionally, the memory and the processor may be integrated together, or disposed separately.

Optionally, the communications apparatus may further include a transceiver.

An eighth aspect provides a chip. The chip includes a processing module and a communications interface. The processing module is configured to control the communications interface to communicate with the outside, and the processing module is further configured to implement the method in the first aspect, the second aspect, the third aspect, the fourth aspect, or the fifth aspect.

For example, the processing module is a processor.

A ninth aspect provides a computer-readable storage medium. The computer-readable storage medium stores a computer program (which may also be referred to as instructions or code) used to implement the method in the first aspect, the second aspect, the third aspect, the fourth aspect, or the fifth aspect.

For example, when the computer program is executed by a computer, the computer is enabled to perform the method in the first aspect, the second aspect, the third aspect, the fourth aspect, or the fifth aspect. The computer may be a communications apparatus.

A tenth aspect provides a computer program product. The computer program product includes a computer program (which may also be referred to as instructions or code), and when the computer program is executed by a computer, the computer is enabled to implement the method in the first aspect, the second aspect, the third aspect, the fourth aspect, or the fifth aspect. The computer may be a communications apparatus.

An eleventh aspect provides a communications system, including the communications apparatus that is provided in the sixth aspect and that is configured to perform the method provided in the first aspect, the communications apparatus that is provided in the sixth aspect and that is configured to perform the method provided in the second aspect, and a terminal device.

The communications apparatus that is provided in the sixth aspect and that is configured to perform the method provided in the first aspect may be referred to as a master node, and the communications apparatus that is provided in the sixth aspect and that is configured to perform the method provided in the second aspect may be referred to as a secondary node.

In the communications system, the terminal device may establish radio links with the master node and the secondary node by using a dual-connectivity technology.

A twelfth aspect provides a communications system, including the communications apparatus that is provided in the sixth aspect and that is configured to perform the method provided in the third aspect, the communications apparatus that is provided in the sixth aspect and that is configured to perform the method provided in the fourth aspect, and the communications apparatus that is provided in the sixth aspect and that is configured to perform the method provided in the fifth aspect.

The communications apparatus that is provided in the sixth aspect and that is configured to perform the method provided in the third aspect may be referred to as a secondary node, the communications apparatus that is provided in the sixth aspect and that is configured to perform the method provided in the fourth aspect may be referred to as a master node, and the communications apparatus that is provided in the sixth aspect and that is configured to perform the method provided in the fifth aspect may be referred to as a terminal device.

In the communications system, the terminal device may establish radio links with the master node and the secondary node by using a dual-connectivity technology.

Based on the foregoing description, in the method provided in the first aspect or the second aspect, the master node sends a timing difference between cells and identification information of a cell (non-primary cell) corresponding to the timing difference to the secondary node, so that the secondary node can identify the cell (non-primary cell) corresponding to the timing difference.

The method provided in the third aspect, the fourth aspect, or the fifth aspect can prevent an SFTD measurement task configured for the terminal device from exceeding the capability of the terminal device.

DETAILED DESCRIPTION OF ILLUSTRATIVE EMBODIMENTS

The following describes technical solutions of this application with reference to the accompanying drawings.

Unless otherwise defined, all technical and scientific terms used in this specification have a same meaning as that usually understood by a person skilled in the art of this application. The terms used in the specification of this application are merely for the purpose of describing specific embodiments, and are not intended to limit this application.

To better understand the embodiments of this application, the following first describes a communications system to which the embodiments of this application is applicable and related concepts.

The embodiments of this application may be applied to various communications systems, for example, a long term evolution (LTE) system, a $5^{th}$ generation (5G) mobile communications system, and machine to machine communications (M2M) system, or another communications system to be evolved in the future. A 5G radio air interface technology is referred to as new radio (NR), and a 5G system may be referred to as an NR system.

Figure 1:
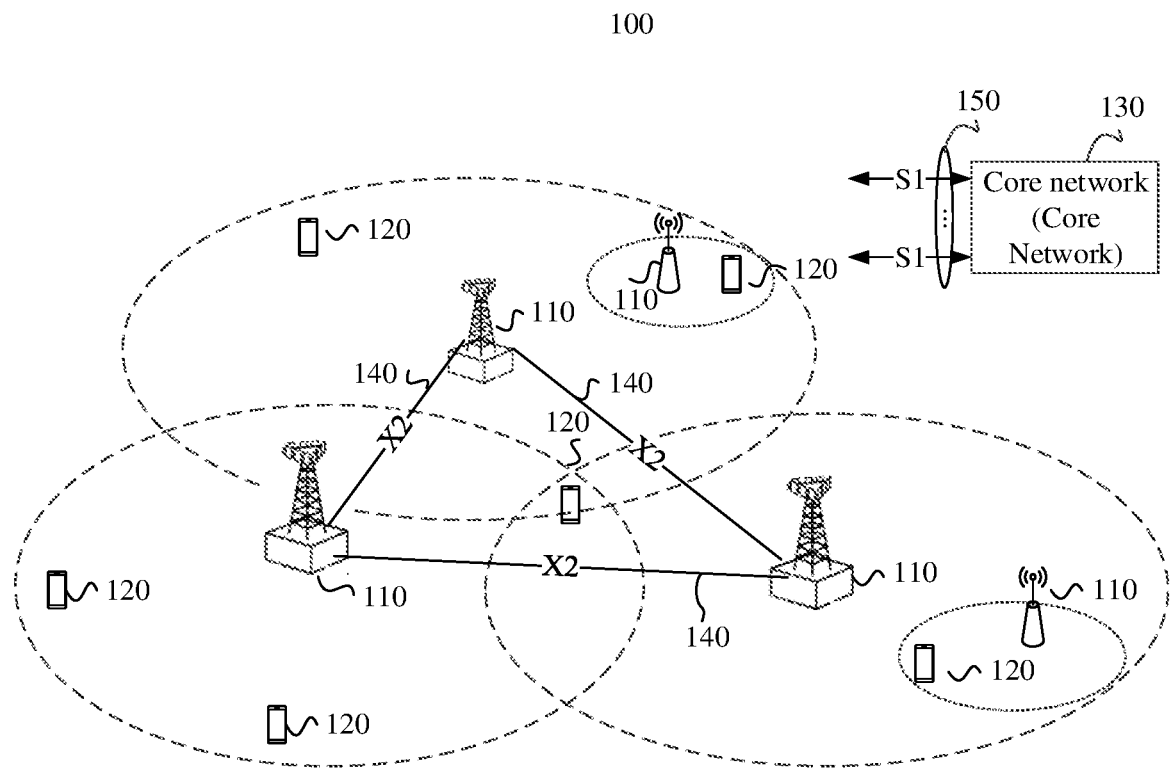
FIG. 1 is a schematic diagram of an architecture of a wireless communications system to which an embodiment of this application is applicable.

FIG. 1 is a schematic diagram of an architecture of a wireless communications system 100 to which an embodiment of this application is applicable. As shown in FIG. 1, the wireless communications system 100 may include one or more network devices 110, one or more terminal devices 120, and a core network 130. The one or more network devices 110 constitute a radio access network (RAN) (not shown in FIG. 1).

The network device 110 may be configured to communicate with the one or more terminal devices 120, or may be configured to communicate with one or more base stations that have some functions of the terminal device. Optionally, the network device 110 may be configured to, under control of a network device controller (not shown in FIG. 1), communicate with the terminal device 120 through one or more antennas. The network device controller may be a part of the core network 130, or may be integrated into the network device 110.

For example, the network device 110 may be configured to transmit control information or user data to the core network 130 through a backhaul interface 150 (for example, an S1 interface). For another example, the network devices 110 may directly or indirectly communicate with each other through a non-ideal backhaul interface 140 (for example, an X2 interface).

The network device 110 may be referred to as a base station. The base station may be in a plurality of forms, for example, a macro base station, a micro base station, a relay station, or an access point. For example, the network device 110 may be an evolved NodeB (eNB) in an LTE system, a 5G system, or a transmission reception point (TRP). For example, in FIG. 1, some network devices 110 are eNBs and some are gNBs. In addition, the network device 110 may alternatively be a central unit (CU) or another network entity. Optionally, the network device 110 may include some or all of functions of the foregoing network entity.

The terminal device 120 may communicate with the core network 130 by using the RAN. The terminal devices 120 may be distributed in the entire wireless communications system 100. The terminal device 120 may be stationary, or may be mobile.

The terminal device 120 may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. For example, the terminal device 120 may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, or a wireless terminal in a smart home.

The network device and/or the terminal device in the embodiments of this application may be provided with a plurality of antennas. The plurality of antennas may include at least one transmit antenna configured to send a signal and at least one receive antenna configured to receive a signal. In addition, the communications device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

The wireless communications system shown in FIG. 1 is merely intended to more clearly describe the technical solutions in this application, but constitutes no limitation on this application. A person of ordinary skill in the art may learn that, with evolution of network architectures and emergence of new service scenarios, the technical solutions provided in the embodiments of this application are also applicable to a similar technical problem.

The following describes concepts in the embodiments of this application.

1. Dual-Connectivity (DC)

Figure 2:
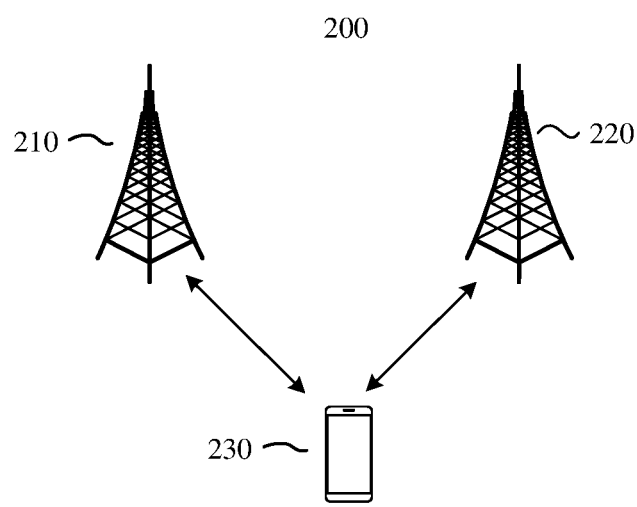
FIG. 2 is a schematic diagram of a dual-connectivity communication scenario.

The dual-connectivity is an important technology introduced in the 3GPP Release-12 version. The dual-connectivity technology means that a terminal device may establish radio links with two base stations. In an example, FIG. 2 shows a schematic diagram of a scenario of a communications system 200 in dual-connectivity communication. As shown in FIG. 2, the communications system 200 includes at least two network devices, for example, network devices 210 and 220 shown in FIG. 2. The communications system 200 may further include at least one terminal device, for example, a terminal device 230 shown in FIG. 2.

The terminal device 230 may establish radio links with the network device 210 and the network device 220 by using the dual-connectivity technology or a multi-connectivity technology.

The network device 210 and the network device 220 may be in non-ideal backhaul. For example, the network device 210 and the network device 220 may implement carrier aggregation through an X2 interface, to provide a higher rate for the terminal device.

Among a plurality of network devices in a dual-connectivity scenario, a network device configured for initial access of the terminal device may be referred to as a master base station. The master base station is responsible for radio resource control (RRC) communication with the terminal device. The master base station may also be referred to as a master station.

Among the plurality of network devices in the dual-connectivity scenario, a network device added during RRC reconfiguration may be referred to as a secondary base station. The secondary base station is configured to provide an additional radio resource for the terminal device. The secondary base station may also be referred to as a secondary station.

For example, in the dual-connectivity scenario shown in FIG. 2, the network device 210 may be a master base station and the network device 220 may be a secondary base station, or, the network device 220 may be a master base station and the network device 210 may be a secondary base station.

Among the plurality of network devices in the dual-connectivity scenario, there may be one network device configured to exchange RRC messages with the terminal device and implement interaction with a core network control plane. The network device may be referred to as a master node (MN).

Among the plurality of network devices in the dual-connectivity scenario, the other network devices different from the network device that serves as the master node may be referred to as secondary nodes (SNs).

The master node may be a master base station. The secondary node may be a secondary base station.

A plurality of serving cells in the master node may form a master cell group (MCG). The serving cell is a cell configured by a network for the terminal device to perform uplink and downlink transmission. The master cell group may include one primary cell (PCell). Optionally, the master cell group may further include one or more secondary cells (SCells). For example, the master node includes one PCell. For another example, the master node includes one PCell and one or more SCells.

A plurality of serving cells in the secondary node may form a secondary cell group (SCG). The secondary cell group may include one primary secondary cell (PSCell). The primary secondary cell may also be referred to as a special cell. Optionally, the secondary cell group may further include one or more SCells. For example, the secondary node includes one PSCell. For another example, the secondary node includes one PSCell and one or more SCells.

For example, in the dual-connectivity scenario shown in FIG. 2, the network device 210 may be a master node and the network device 220 may be a secondary node, or, the network device 220 may be a master node and the network device 210 may be a secondary node.

The master node may be an MeNB or an MgNB. That the master node is the MeNB indicates that a base station (eNB) or a central unit (CU) of an LTE system serves as the master node. That the master node is the MgNB indicates that a base station (gNB) or a central unit (CU) of a 5G system serves as the master node.

The secondary node may be an SeNB or an SgNB. That the secondary node is the SeNB indicates that the eNB serves as the secondary node. That the secondary node is the SgNB indicates that the gNB serves as the secondary node.

The dual-connectivity (DC) may have different names based on different architectures of the dual-connectivity (DC).

A dual connectivity constructed by a base station (eNB) of a 4G system and a base station (gNB) of a 5G system by using the base station (eNB) of the 4G system (namely, an LTE system) as an anchor may be referred to as an EN-DC (E-UTRA-NR dual connectivity). In this architecture, the base station of the 5G system may be referred to as an en-gNB.

A dual connectivity constructed by an eNB and a gNB by using the gNB as an anchor may be referred to as an NE-DC (NR E-UTRA dual connectivity).

A dual connectivity constructed by a base station (ng-eNB) after the 4G system is upgraded and a gNB by using the ng-eNB as an anchor may be referred to as an NGEN-DC (NG-RAN E-UTRA-NR dual connectivity).

Both a master node and a secondary node of an NR-DC (NR-NR dual connectivity) are gNBs.

Secondary nodes in different DCs are different. For example, secondary nodes in the (NG)EN-DC and the NR-DC are gNBs and a secondary node in the NE-DC is an eNB.

For example, the network device 210 and the network device 220 in FIG. 2 may correspond to any two network devices 110 in FIG. 1 that may communicate through an X2 interface. The terminal device 230 in FIG. 2 may correspond to the terminal device 120 in FIG. 1.

2. System Frame Number and Frame Timing Difference (System Frame Number (SFN) and Frame Timing Difference, SFTD)

The SFTD indicates a timing difference between two base stations. The timing difference between two base stations refers to a timing difference between cells of the two base stations. For example, if a base station 1 has a cell 1 and a cell 2 and a base station 2 has a cell 3, a timing difference between the base station 1 and the base station 2 may be a timing difference between the cell 1 and the cell 3, or may be a timing difference between the cell 2 and the cell 3.

In a dual-connectivity scenario, a network device may configure a terminal device to measure an SFTD.

The network device may configure the terminal device to measure an SFTD between a primary cell of a master node and a cell of a secondary node, for example, an SFTD between a primary cell (PCell) of the master node and a primary secondary cell (PSCell) of the secondary node, or an SFTD between the primary cell (PCell) of the master node and a secondary cell (SCell) of the secondary node.

Alternatively, the network device configures the terminal device to measure an SFTD between a primary cell of a master node and a neighboring cell, for example, an SFTD between a primary cell (PCell) of the master node and the neighboring cell. For example, the neighboring cell is a 5G or 4G cell.

Generally, the terminal device may be configured by the master node to measure an SFTD.

The terminal device may send a measurement result of the SFTD to the master node through an air interface. The air interface represents an interface between the network device and the terminal device.

The master node may send the measurement result of the SFTD to a secondary node. In the conventional technology, the measurement result of the SFTD sent by the master node to the secondary node includes a measurement value of the SFTD and a physical cell identifier (physical cell identifier, PCI) of a PSCell or a neighboring cell corresponding to the SFTD.

In some cases, the master node may send measurement results of a plurality of SFTDs to the secondary node. The plurality of SFTDs may be timing differences between the PCell and a plurality of PSCells (or neighboring cells).

For example, the plurality of SFTDs are timing differences between the PCell and the plurality of PSCells. The plurality of PSCells may use different frequencies. In the current technology, a same PCI may be allocated to cells that use different frequencies. Therefore, when the master node sends the measurement results of the plurality of SFTDs to the secondary node, in an existing method for transmitting an SFTD, the secondary node may not be able to accurately identify a PSCell or a neighboring cell corresponding to the SFTD.

To resolve the foregoing problem, this application provides a method and an apparatus for transmitting a timing difference, to enable a secondary node to accurately identify a cell corresponding to an SFTD in a dual-connectivity communication scenario to some extent.

The embodiments of this application are applied to a dual-connectivity communication scenario, for example, may be applied to the communications system shown in FIG. 2. The embodiments of this application may also be applied to a multi-connectivity communication scenario.

The network device in the embodiments of this application is the network device 110 described above. The terminal device in the embodiments of this application is the terminal device 120 described above.

Figure 3:
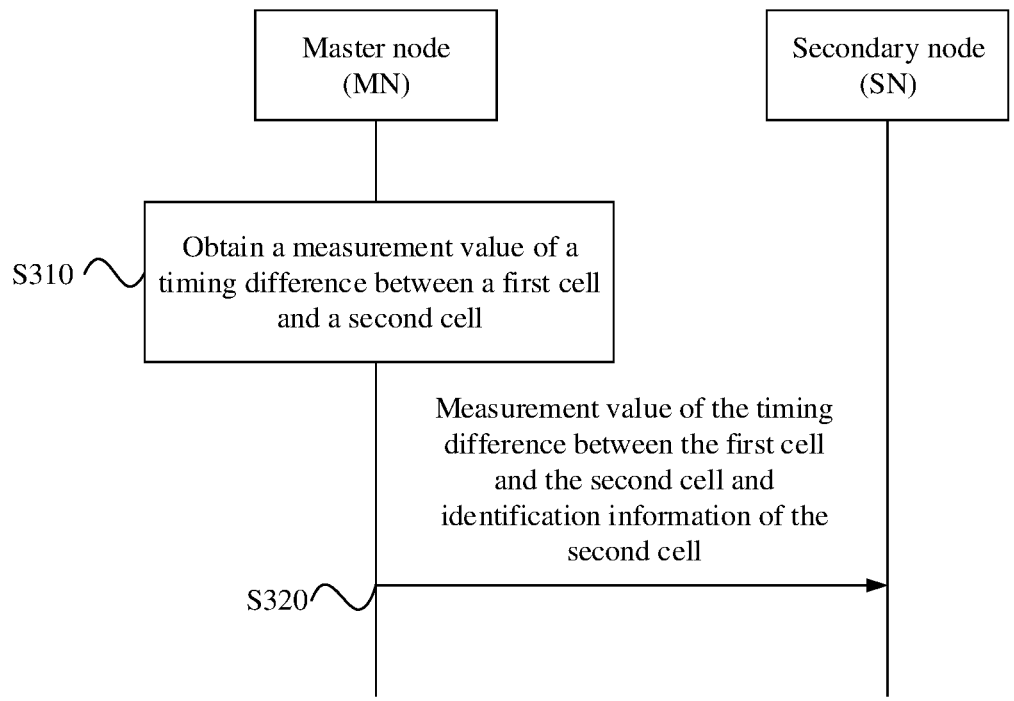
FIG. 3 is a schematic flowchart of a method for transmitting a timing difference according to an embodiment of this application.

FIG. 3 is a schematic flowchart of a method for transmitting a timing difference according to an embodiment of this application. The method includes the following steps.

S310: A master node obtains a measurement value of a timing difference between a first cell and a second cell.

S320: The master node sends the measurement value of the timing difference between the first cell and the second cell and identification information of the second cell to a secondary node.

The master node and the secondary node represent network devices in a dual-connectivity communication scenario. For example, the master node is the network device 210 shown in FIG. 2 and the secondary node is the network device 220 shown in FIG. 2. For details, refer to the foregoing description of the master node and the secondary node.

The first cell is a primary cell (PCell) of the master node.

The second cell is a primary secondary cell (PSCell) of the secondary node, or the second cell is another cell. For example, the second cell is a secondary cell (SCell) of the secondary node. For another example, the second cell is a neighboring cell of a terminal device, and the neighboring cell is an LTE cell or an NR cell. The terminal device herein is a terminal device that establishes dual-connectivity communication or multi-connectivity communication with the first cell and the second cell.

In an example, the timing difference in this embodiment of this application may include any one of the following: a timing difference between the PCell and the PSCell, a timing difference between the PCell and the neighboring cell, or a timing difference between the PCell and the SCell (which represents a serving cell different from the PSCell of the secondary node).

Identification information of the second cell represents information that can identify the second cell.

For example, after receiving the timing difference and the identification information of the second cell from the master node, the secondary node may obtain, based on the identification information of the second cell, the second cell corresponding to the timing difference.

Optionally, the identification information of the second cell includes a physical cell identifier (PCI) and frequency information of the second cell.

The PCI is used to distinguish between different cells. PCI values are limited. For example, there are 504 PCI values in an LTE system and there are 1008 PCI values in an NR system. In network deployment, the PCI is inevitably reused. For example, a same PCI may be allocated to cells that use different frequencies. Generally, reuse of a PCI is avoided for cells that use a same frequency. For example, different PCIs are allocated to neighboring cells that use a same frequency. That is, during network deployment, different PCIs are most probably allocated to different cells that use a same frequency. In this case, a cell can be determined based on the PCI and frequency information to some extent.

It should be understood that, after receiving a timing difference between cells and identification information of a cell from the master node, the secondary node may obtain, based on a PCI and frequency information of the cell, a second cell corresponding to the timing difference.

In this application, the master node sends the timing difference between the first cell and the second cell and the PCI and frequency information of the second cell to the secondary node, so that the secondary node can identify the second cell corresponding to the timing difference to some extent.

Optionally, the identification information of the second cell includes a cell global identifier (CGI) of the second cell.

The CGI is identification code for uniquely identifying a cell globally. It may be understood that the CGI of the second cell may uniquely identify the second cell.

It should be understood that, after receiving a timing difference between cells and identification information of a cell from the master node, the secondary node may obtain, based on a CGI of the cell, a second cell corresponding to the timing difference.

In this application, the master node sends the timing difference between the first cell and the second cell and the CGI of the second cell to the secondary node, so that the secondary node can identify the second cell corresponding to the timing difference.

It should be understood that CGIs in various standards may be referred to as CGIs. Alternatively, different names may be further defined for CGIs in various standards. For example, a CGI of an LTE cell may be referred to as an E-UTRAN cell global identifier (ECGI), and a CGI of an NR cell may be referred to as an NR cell global identifier (NCGI). The ECGI may be constructed by a public land mobile network (PLMN) ID and an E-UTRA cell identifier (cell ID), and the NCGI may be constructed by a PLMN ID and an NR cell identifier. Therefore, the CGI described in this embodiment of this application is equivalent to an ECGI if applied to an LTE cell, and is equivalent to an NCGI if applied to an NR cell.

Optionally, in an embodiment in which the identification information of the second cell includes the CGI of the second cell, the identification information of the second cell may further include a PCI of the second cell.

Optionally, in an embodiment in which the identification information of the second cell includes the CGI of the second cell, the identification information of the second cell may further include the frequency information of the second cell.

It can be learned from the foregoing description that, in this application, the master node sends a measurement value of a timing difference between cells and identification information of a non-primary cell (for example, the second cell in this embodiment of this application) corresponding to the timing difference to the secondary node, so that the secondary node can identify the cell corresponding to the timing difference to some extent.

When the master node sends the timing difference between the first cell and the second cell to the secondary node, the master node may send a PCI of the first cell to the secondary node.

The measurement value of the timing difference between the first cell and the second cell may include a system frame number (SFN) difference (sfn-OffsetResult) between the first cell and the second cell, and/or a frame boundary difference (frameBoundaryOffsetResult).

The timing difference in this embodiment of this application may be referred to as, for example, a system frame number and frame timing difference (system frame number (SFN) and frame timing difference, SFTD).

If a new name is used to describe a timing difference between cells when a technology is evolved in the future, the timing difference in this embodiment of this application may be replaced with the corresponding name.

In the following, the timing difference is recorded as the SFTD for description.

Optionally, in the embodiment shown in FIG. 3, in addition to the measurement value of the SFTD between the first cell and the second cell and the identification information of the second cell, the master node may further send a measurement value of a reference signal received power (RSRP) (rsrp-Result) to the secondary node. The RSRP herein refers to an RSRP of a cell different from the primary cell (PCell) in the cell corresponding to the SFTD, for example, an RSRP of a primary secondary cell (PSCell) or a neighboring cell.

In step S320, the measurement value that is of the SFTD between the first cell and the second cell and that is sent by the master node to the secondary node may be measured by the terminal device configured by the master node.

Optionally, in the embodiment shown in FIG. 3, step S310 includes: The master node sends measurement configuration information of the SFTD between the first cell and the second cell to the terminal device, and the terminal device measures the SFTD between the first cell and the second cell based on the measurement configuration information of the SFTD and reports the measurement value of the SFTD between the first cell and the second cell to the master node.

For example, the measurement configuration information of the SFTD may include cell identifiers of the first cell and the second cell, for example, PCIs. In other words, the measurement configuration information of the SFTD may enable the terminal device to learn that an SFTD between which two cells is to be measured. It should be understood that the measurement configuration information of the SFTD may further include other information related to measurement of the SFTD.

For example, in addition to reporting the measurement value of the SFTD between the first cell and the second cell, the terminal device may further report the PCI of the second cell to the master node.

In step S320, the measurement value that is of the SFTD and that is sent by the master node to the secondary node may be a latest measurement value measured by the terminal device configured by the master node before step S320, or may be a non-latest measurement value measured by the terminal device configured by the master node before step S320.

For example, before sending the measurement value of the SFTD to the secondary node, the master node configures the terminal device to measure the SFTD between the first cell and the second cell for a plurality of times. In step S320, the measurement value that is of the SFTD and that is sent by the master node to the secondary node may be a measurement value of the SFTD most recently measured by the terminal device configured by the master node, or may be a measurement value of the SFTD not most recently measured by the terminal device configured by the master node, for example, a measurement value of the SFTD measured in a penultimate measurement.

If the terminal device currently performing dual-connectivity communication with the master node and the secondary node is recorded as a current terminal device, optionally, the measurement value that is of the SFTD and that is sent by the master node to the secondary node in step S320 may alternatively be measured and reported by another terminal device different from the current terminal device. For the another terminal device, the first cell may not be a primary cell, and the second cell may not be a primary secondary cell or a neighboring cell.

In step S320, after receiving the measurement value of the SFTD and the identification information of the cell that are sent by the master node, the secondary node may obtain, by parsing, the measurement value of the SFTD as the timing difference between the first cell and the second cell.

It should be understood that after obtaining the SFTD between the first cell and the second cell, the secondary node (or the master node) may perform related processing based on the SFTD. For example, the SFTD may be used for the purpose of discontinuous reception (DRX) alignment or identification of a measurement gap (for the purpose of DRX alignment and identification of measurement gap).

The measurement value of the SFTD between the first cell and the second cell and the identification information of the second cell may be carried in a same information element, or at least some of the identification information of the second cell and the measurement value of the SFTD may be carried in different information elements.

When at least some information in the identification information of the second cell and the measurement value of the SFTD are carried in different information elements, a location of the at least some information in the identification information of the second cell in a corresponding information element correspond to a location of the measurement value of the SFTD in a corresponding information element.

It should be noted that the information element described in the context refers to an information element (IE).

For example, there may be an inclusion relationship between information elements. For example, an information element 1 includes an information element 2, and the information element 2 includes data or information. For another example, an information element 1 includes an information element 2, the information element 2 includes an information element 3, and the information element 3 includes data or information.

Optionally, an information element may also be referred to as a field.

Optionally, when the identification information of the second cell includes the PCI and the frequency information of the second cell, the measurement value of the SFTD between the first cell and the second cell and the PCI of the second cell are carried in a first information element, and the frequency information of the second cell is carried in a second information element. A location of the frequency information of the second cell in the second information element is in a one-to-one correspondence with a location of the measurement value of the SFTD in the first information element.

That the location of the frequency information of the second cell in the second information element is in a one-to-one correspondence with the location of the measurement value of the SFTD in the first information element indicates that the location of the frequency information of the second cell corresponding to the SFTD in the second information element may be determined based on the location of the measurement value of the SFTD in the first information element, or the location of the measurement value of the SFTD corresponding to the second cell in the first information element may be determined based on the location of the frequency information of the second cell in the second information element.

For example, a location (or a rank) of the frequency information of the second cell in the second information element is the same as a location (or a rank) of the measurement value of the SFTD in the first information element.

It may be understood that although the measurement value of the SFTD between the first cell and the second cell and the PCI of the second cell are carried in an information element different from an information element in which the frequency information of the second cell is carried, the measurement value of the SFTD between the first cell and the second cell and the PCI of the second cell have a correspondence with the frequency information of the second cell.

For example, after receiving the first information element and the second information element that are sent by the master node, the secondary node may learn that frequency information of a specific cell in the second information element corresponds to a measurement value of a specific SFTD in the first information element.

In an example, the measurement value of the SFTD between the first cell and the second cell and the PCI of the second cell are carried in a first information element named "MeasResultCellListSFTD", and the frequency information of the second cell is carried in a second information element named "sftdFrequencyList".

The information element named "MeasResultCellListSFTD" may further be classified into two types: a "MeasResultCellListSFTD-NR" information element and a "MeasResultCellListSFTD-EUTRA" information element. The "MeasResultCellListSFTD-NR" information element is applicable to a case in which the secondary node in the dual-connectivity communication scenario is a gNB, and the "MeasResultCellListSFTD-EUTRA" information element is applicable to a case in which the secondary node in the dual-connectivity communication scenario is an eNB.

By way of example and not limitation, a structure of the "MeasResultCellListSFTD-NR" information element is shown in the following.

```
MeasResultCellListSFTD-NR::=      SEQUENCE (SIZE (1..maxCellSFTD)) OF
    MeasResultCellSFTD-NR
MeasResultCellSFTD-NR::=          SEQUENCE {
    physCellId                PhysCellId,
    sfn-OffsetResult          INTEGER (0..1023),
    frameBoundaryOffsetResult INTEGER (-30720..30719),
    rsrp-Result               RSRP-Range    OPTIONAL
}
```

By way of example and not limitation, a structure of the "MeasResultCellListSFTD-EUTRA" information element is shown in the following.

```
MeasResultCellListSFTD-EUTRA::=   SEQUENCE (SIZE (1..maxCellSFTD)) OF
    MeasResultCellSFTD-EUTRA
MeasResultCellSFTD-EUTRA::=       SEQUENCE {
    eutra-PhysCellId          EUTRA-PhysCellId,
    sfn-OffsetResult          INTEGER (0..1023),
    frameBoundaryOffsetResult INTEGER (-30720..30719),
    rsrp-Result               RSRP-Range    OPTIONAL
}
```

PhysCellId represents a physical cell identifier (PCI), sfn-OffsetResult represents a system frame number (SFN) difference, frameBoundaryOffsetResult represents a frame boundary difference, and rsrp-Result represents a reference signal received power (RSRP).

The information element named "sftdFrequencyList" may also be classified into two types: an "sftdFrequencyList-NR" information element and an "sftdFrequencyList-EUTRA" information element. The "sftdFrequencyList-NR" information element is applicable to a case in which the secondary node in the dual-connectivity communication scenario is a gNB, and the "sftdFrequencyList-EUTRA" information element is applicable to a case in which the secondary node in the dual-connectivity communication scenario is an eNB.

By way of example and not limitation, a structure of the "sftdFrequencyList-NR" information element is shown in the following.

sftdFrequencyList-NR::=SEQUENCE (SIZE (1 . . . maxCellSFTD) OF ARFCN-ValueNR

By way of example and not limitation, a structure of the "sftdFrequencyList-EUTRA" information element is shown in the following.

sftdFrequencyList-EUTRA::=SEQUENCE (SIZE (1 . . . maxCellSFTD) OF ARFCN-ValueEUTRA For example, a location (or a rank) of the frequency information of the second cell in the "sftdFrequencyList" information element is the same as a location (or a rank) of the measurement value of the SFTD in the "MeasResultCellListSFTD" information element.

For example, the secondary node in the dual-connectivity communication scenario is a gNB. The measurement value of the SFTD is located in an $i^{th}$ "MeasResultCellSFTD-NR" information element in the "MeasResultCellListSFTD-NR" information element. The frequency information of the second cell is an $i^{th}$ frequency information recorded in the "sftdFrequencyList-NR" information element, where i is a positive integer. For example, i is equal to 1.

For example, the secondary node in the dual-connectivity communication scenario is an eNB. The measurement value of the SFTD is located in a $j^{th}$ "MeasResultCellSFTD-EUTRA" information element in the "MeasResultCellListSFTD-EUTRA" information element. The frequency information of the second cell is a $j^{th}$ frequency information recorded in the "sftdFrequencyList-EUTRA" information element, where j is a positive integer. For example, j is equal to 1.

Optionally, when the identification information of the second cell includes the CGI of the second cell, the measurement value of the SFTD between the first cell and the second cell is carried in a first information element, and the CGI of the second cell is carried in a second information element. A location of the CGI of the second cell in the second information element is in a one-to-one correspondence with a location of the measurement value of the timing difference in the first information element.

That the location of the CGI of the second cell in the second information element is in a one-to-one correspondence with the location of the measurement value of the SFTD in the first information element indicates that the location of the CGI of the second cell corresponding to the SFTD in the second information element may be determined based on the location of the measurement value of the SFTD in the first information element, or the location of the measurement value of the SFTD corresponding to the second cell in the first information element may be determined based on the location of the CGI of the second cell in the second information element.

For example, a location (or a rank) of the CGI of the second cell in the second information element is the same as a location (or a rank) of the measurement value of the SFTD in the first information element.

It may be understood that although the measurement value of the SFTD between the first cell and the second cell and the PCI of the second cell are carried in an information element different from an information element in which the CGI of the second cell is carried, the measurement value of the SFTD between the first cell and the second cell and the PCI of the second cell have a correspondence with the CGI of the second cell.

For example, after receiving the first information element and the second information element that are sent by the master node, the secondary node may learn that a CGI of a specific cell in the second information element corresponds to a measurement value of a specific SFTD in the first information element.

In an example, the measurement value of the SFTD between the first cell and the second cell is carried in a first information element named "MeasResultCellListSFTD", and the CGI information of the second cell is carried in a second information element named "sftdCgiList".

For example, the CGI information may include one or more of the following: a PLMN ID, frequency band information, tracking area code (TAC) information, a cell identifier (cell ID), or the like.

For description of the information element named "MeasResultCellListSFTD", the foregoing description may be referred to and details are not described herein again.

The information element named "sftdCgiList" may also be classified into two types: an "sftdCgiList-NR" information element and an "sftdCgiList-EUTRA" information element. The "sftdCgiList-NR" information element is applicable to a case in which the secondary node in the dual-connectivity communication scenario is a gNB, and the "sftdCgiList-EUTRA" information element is applicable to a case in which the secondary node in the dual-connectivity communication scenario is an eNB.

By way of example and not limitation, a structure of the "sftdCgiList-NR" information element is shown in the following.

sftdCgiList-NR::=SEQUENCE (SIZE (1 . . . maxCellSFTD) OF CGI InfoNR

By way of example and not limitation, a structure of the "sftdCgiList-EUTRA" information element is shown in the following.

sftdCgiList-EUTRA::=SEQUENCE (SIZE (1 . . . maxCellSFTD) OF CGI-InfoEUTRA

A "CGI-InfoNR" information element may reuse a "CGI-InfoNR" information element in the conventional technology, and a "CGI-InfoEUTRA" information element may also reuse a "CGI-InfoEUTRA" information element in the conventional technology.

For example, a location (or a rank) of the CGI of the second cell in the "sftdCgiList" information element is the same as a location (or a rank) of the measurement value of the SFTD in the "MeasResultCellListSFTD" information element.

For example, the secondary node in the dual-connectivity communication scenario is a gNB. The measurement value of the SFTD is located in an $i^{th}$ "MeasResultCellSFTD-NR" information element in the "MeasResultCellListSFTD-NR" information element. The CGI of the second cell is $i^{th}$ CGI information recorded in the "sftdCgiList-NR" information element, where i is a positive integer. For example, i is equal to 1.

For example, the secondary node in the dual-connectivity communication scenario is an eNB. The measurement value of the SFTD is located in a $j^{th}$ "MeasResultCellSFTD-EUTRA" information element in the "MeasResultCellList-SFTD-EUTRA" information element. The CGI of the second cell is $j^{th}$ CGI information recorded in the "sftdCgiList-EUTRA" information element, where j is a positive integer. For example, j is equal to 1.

Optionally, in an embodiment in which the identification information of the second cell includes the CGI of the second cell, the identification information of the second cell may further include a PCI of the second cell.

For example, the measurement value of the SFTD between the first cell and the second cell and the PCI of the second cell are carried in a first information element (for example, an information element named "MeasResultCellListSFTD"), and the CGI of the second cell is carried in a second information element (for example, an information element named "sftdCgiList").

Optionally, in the embodiment shown in FIG. 3, the measurement value of the SFTD between the first cell and the second cell and the identification information of the second cell are carried in a same information element.

For example, when the identification information of the second cell includes the PCI and the frequency information of the second cell, the measurement value of the SFTD between the first cell and the second cell, the PCI of the second cell, and the frequency information of the second cell are carried in a same information element.

When the secondary node in the dual-connectivity communication scenario is a gNB, the measurement value of the SFTD between the first cell and the second cell, the PCI of the second cell, and the frequency information of the second cell are carried in an information element named "MeasRestulCellListSFTD-NR2". When the secondary node in the dual-connectivity communication scenario is an eNB, the measurement value of the SFTD between the first cell and the second cell, the PCI of the second cell, and the frequency information of the second cell are carried in an information element named "MeasRestulCellListSFTD-EUTRA2".

By way of example and not limitation, a structure of the "MeasResultCellListSFTD-NR2" information element is shown in the following.

```
MeasResultCellListSFTD-NR2::=        SEQUENCE (SIZE (1..maxCellSFTD)) OF
MeasResultCellSFTD-NR2
    MeasResultCellSFTD-NR2::=        SEQUENCE {
        ssbFrequency                 ARFCN-ValueNR,
        physCellId                   PhysCellId,
        sfn-OffsetResult             INTEGER (0..1023),
        frameBoundaryOffsetResult    INTEGER (-30720..30719),
        rsrp-Result                  RSRP-Range        OPTIONAL

}
``` ssbFrequency represents frequency information of a cell.

By way of example and not limitation, a structure of the "MeasResultCellListSFTD-EUTRA2" information element is shown in the following.

```
MeasResultCellListSFTD-EUTRA2::=     SEQUENCE (SIZE (1..maxCellSFTD))
OF MeasResultCellSFTD-EUTRA2
    MeasResultCellSFTD-EUTRA2::=     SEQUENCE {
        eutraFrequency               ARFCN-ValueEUTRA,
        eutra-PhysCellId             EUTRA-PhysCellId,
        sfn-OffsetResult             INTEGER (0..1023),
        frameBoundaryOffsetResult    INTEGER (-30720..30719),
        rsrp-Result       RSRP-Range        OPTIONAL

}
``` ssbFrequency represents frequency information of a cell.

For another example, when the identification information of the CGI of the second cell includes the CGI of the second cell, the measurement value of the SFTD between the first cell and the second cell and the CGI of the second cell are carried in a same information element.

When the secondary node in the dual-connectivity communication scenario is a gNB, the measurement value of the SFTD between the first cell and the second cell and the CGI of the second cell are carried in an information element named "MeasRestulCellListSFTD-NR2". When the secondary node in the dual-connectivity communication scenario is an eNB, the measurement value of the SFTD between the first cell and the second cell and the frequency information of the second cell are carried in an information element named "MeasRestulCellListSFTD-EUTRA2".

In this case, the measurement value of the SFTD between the first cell and the second cell and the PCI and the CGI of the second cell are carried in a same information element.

By way of example and not limitation, a structure of the "MeasResultCellListSFTD-NR2" information element is shown in the following.

```
MeasResultCellListSFTD-NR2::=      SEQUENCE (SIZE (1..maxCellSFTD)) OF
MeasResultCellSFTD-NR2
    MeasResultCellSFTD-NR2::=          SEQUENCE {
        cgiInfoNR                 CGI-InfoNR,
        sfn-OffsetResult              INTEGER (0..1023),
        frameBoundaryOffsetResult      INTEGER (-30720..30719),
        rsrp-Result           RSRP-Range       OPTIONAL
}
```

By way of example and not limitation, a structure of the "MeasResultCellListSFTD-EUTRA2" information element is shown in the following.

```
MeasResultCellListSFTD-EUTRA2::=        SEQUENCE (SIZE (1..maxCellSFTD))
OF MeasResultCellSFTD-EUTRA2
    MeasResultCellSFTD-EUTRA2::=          SEQUENCE {
        cgiInfoEutra              CGI-InfoEUTRA,
        sfn-OffsetResult              INTEGER (0..1023),
        frameBoundaryOffsetResult          INTEGER (-30720..30719),
        rsrp-Result           RSRP-Range       OPTIONAL
}
```

For Architectures of the CGI-InfoNR and the CGI-InfoEUTRA, the foregoing descriptions may be referred to, and details will not be described herein again.

In an example, an information element may be added based on the existing protocol, and is used to carry the measurement value of the SFTD between the first cell and the second cell and the identification information of the second cell.

It should be understood that the information element named "MeasResultCellListSFTD", the information element named "sftdFrequencyList", and the information element named "sftdCgiList" are merely examples rather than for limitation.

It should be further understood that the master node may further send the measurement value of the SFTD between the first cell and the second cell and the identification information of the second cell to the secondary node in another feasible signaling format.

For example, a measurement value of an SFTD (the SFTD between the first cell and the second cell) and identification information of a second cell corresponding to the SFTD may be collectively referred to as a measurement result of the SFTD.

In the embodiment described with reference to FIG. 3, an example in which the master node sends a measurement result of an SFTD to a secondary node is used for description. This application is not limited herein. The master node may further send measurement results of a plurality of SFTDs to the secondary node. The solution in the embodiment shown in FIG. 3 is applicable to a case in which a master node sends a measurement result of each SFTD to a secondary node.

Optionally, in the embodiment shown in FIG. 3, step S320 includes: The master node sends SFTDs between the first cell and a plurality of second cells and identification information of each second cell to the secondary node. The identification information of each second cell includes a PCI and frequency information of the cell, or a CGI of the cell.

N second cells are used as an example, where N is a positive integer. The master node sends to the secondary node: an SFTD between the first cell and a $1^{st}$ second cell and identification information of the $1^{st}$ second cell, an SFTD between the first cell and a $2^{nd}$ second cell and identification information of the $2^{nd}$ second cell, . . . , and an SFTD between the first cell and an $N^{th}$ second cell and identification information of the $N^{th}$ second cell.

For example, the master node may send, in a list manner, the SFTDs between the first cell and the plurality of second cells and the identification information of the plurality of second cells to the secondary node.

In this embodiment, the plurality of second cells may include any one or more of the following cells: a primary secondary cell (PSCell) of the secondary node, a neighboring cell, and a secondary cell (SCell) of the secondary node.

In this embodiment, the plurality of second cells may include cells that use a same frequency and/or cells that use different frequencies.

In an embodiment in which the master node sends measurement results of a plurality of SFTDs to the secondary node, measurement values of different SFTDs are carried in different information elements.

In an embodiment in which the master node sends measurement results of a plurality of SFTDs to the secondary node, optionally, for a same SFTD, the measurement value of the SFTD and the identification information of the second cell corresponding to the SFTD may be carried in a same information element.

For example, the master node sends measurement results of three SFTDs to the secondary node. The master node sends to the secondary node: a measurement value of an SFTD (recorded as SFTD1) between the first cell and a cell a and identification information of the cell a, a measurement value of an SFTD (recorded as SFTD2) between the first cell and a cell b and identification information of the cell b, and a measurement value of an SFTD (recorded as SFTD3) between the first cell and a cell c and identification information of the cell c.

It should be understood that the cells a, b, and c in this example correspond to the plurality of second cells in the foregoing embodiments.

For example, the measurement value of the SFTD1 and the identification information of the cell a are carried in a "MeasResultCellSFTD_1" information element, the measurement value of the SFTD2 and the identification information of the cell b are carried in a "MeasResultCellSFTD_2" information element, and the measurement value of the SFTD3 and the identification information of the cell c are carried in a "MeasResultCellSFTD_3" information element.

For example, the "MeasResultCellSFTD_1" information element, the "MeasResultCellSFTD_2" information element, and the "MeasResultCellSFTD_3" information element may all be located in the "MeasResultCellListSFTD" information element.

In an example, a structure of the "MeasResultCellListSFTD" information element is shown in the following.

```
MeasResultCellListSFTD:: =    SEQUENCE (SIZE (1 ... maxCellSFTD))
                              OF MeasResultCellSFTD
MeasResultCellSFTD_1:: =      SEQUENCE {...}
MeasResultCellSFTD_2:: =      SEQUENCE {...}
MeasResultCellSFTD_3:: =      SEQUENCE {...}
```

It should be understood that the "MeasResultCellListSFTD" information element may be a "MeasResultCellListSFTD-NR" information element or a "MeasResultCellListSFTD-EUTRA" information element.

It can be learned from the above example, the measurement values of different SFTDs are carried in different information elements, and these different information elements may be located in a same large information element.

In the embodiment in which the master node sends measurement results of a plurality of SFTDs to the secondary node, optionally, a measurement value of a same SFTD and the identification information of the second cell may be carried in a same information element, or at least some information in the identification information of the second cell and the measurement value of the SFTD may be carried in different information elements.

When at least some information in the identification information of the second cell and the measurement value of the SFTD are carried in different information elements, a location of the at least some information in the identification information of the second cell in a corresponding information element correspond to a location of the measurement value of the SFTD in a corresponding information element. That is, the location of the measurement value of the SFTD in the corresponding information element is in a one-to-one correspondence with the location of the identification information of the second cell corresponding to the SFTD in the corresponding information element.

The foregoing example in which the master node sends measurement results of three SFTDs to the secondary node is still used. When the identification information of the second cell includes a PCI and frequency information, that is, the identification information of the cell a includes a PCI and frequency information of the cell a, the identification information of the cell b includes a PCI and frequency information of the cell b, and the identification information of the cell c includes a PCI and frequency information of the cell c.

For example, the measurement value of the SFTD1 and the PCI of the cell a are carried in a "MeasResultCellSFTD_1" information element, the measurement value of the SFTD2 and the PCI of the cell b are carried in a "MeasResultCellSFTD_2" information element, and the measurement value of the SFTD3 and the PCI of the cell c are carried in a "MeasResultCellSFTD_3" information element. Frequency information Frequency_1 of the cell a, frequency information Frequency_2 of the cell b, and frequency information Frequency_3 of the cell c are carried in an "sftdFrequencyList" information element.

The "MeasResultCellSFTD_1" information element, the "MeasResultCellSFTD_2" information element, and the "MeasResultCellSFTD_3" information element may all be located in the "MeasResultCellListSFTD" information element, as described in the foregoing description.

For example, a structure of the "sftdFrequencyList" information element is shown in the following.

```
sftdFrequencyList::=    SEQUENCE{
Frequency_1,
Frequency_2,
Frequency_3,
}
```

It can be learned from the example, locations (or ranks) of the frequency information Frequency_1 of the cell a, the frequency information Frequency_2 of the cell b, and the frequency information Frequency_3 of the cell c in the "sftdFrequencyList" information element are in a one-to-one correspondence with locations (or ranks) of the measurement value of the SFTD1, the measurement value of the SFTD2, and the measurement value of the SFTD3 in the "MeasResultCellListSFTD" information element.

It may be understood that, in this example, the "MeasResultCellListSFTD" information element corresponds to the first information element in this embodiment of this application, and the "sftdFrequencyList" information element corresponds to the second information element in this embodiment of this application.

The foregoing example in which the master node sends measurement results of three SFTDs to the secondary node is still used. When the identification information of the second cell includes a CGI, that is, the identification information of the cell a includes a CGI of the cell a, the identification information of the cell b includes a CGI of the cell b, and the identification information of the cell c includes a CGI of the cell c.

For example, the measurement value of the SFTD1 is carried in a "MeasResultCellSFTD_1" information element, the measurement value of the SFTD2 is carried in a "MeasResultCellSFTD_2" information element, and the measurement value of the SFTD3 is carried in a "MeasResultCellSFTD_3" information element. A CGI_1 of the cell a, a CGI_2 of the cell b, and a CGI_3 of the cell c are carried in an "sftdCgiList" information element.

The "MeasResultCellSFTD_1" information element, the "MeasResultCellSFTD_2" information element, and the "MeasResultCellSFTD_3" information element may all be located in the "MeasResultCellListSFTD" information element, as described in the foregoing description.

For example, a structure of the "sftdCgiList" information element is shown in the following.

```
sftdCgiList::=    SEQUENCE{
CGI_1,
CGI_2,
CGI_3,
}
```

It can be learned from the example, locations (or ranks) of the CGI_1 of the cell a, the CGI_2 of the cell b, and the CGI_3 of the cell c in the "sftdCgiList" information element are in a one-to-one correspondence with locations (or ranks) of the measurement value of the SFTD1, the measurement value of the SFTD2, and the measurement value of the SFTD3 in the "MeasResultCellListSFTD" information element.

In this example, optionally, PCI information of the cell a may alternatively be carried in a "MeasResultCellSFTD_1" information element, PCI information of the cell b may alternatively be carried in a "MeasResultCellSFTD_2" information element, and PCI information of the cell c may alternatively be carried in a "MeasResultCellSFTD_3" information element.

It may be understood that, in this example, the "MeasResultCellListSFTD" information element corresponds to the first information element in this embodiment of this application, and the "sftdCgiList" information element corresponds to the second information element in this embodiment of this application.

It should be understood that the "MeasResultCellListSFTD" information element in the foregoing example may be a "MeasResultCellListSFTD-NR" information element or a "MeasResultCellListSFTD-EUTRA" information element. The "sftdFrequencyList" information element may be an "sftdFrequencyList-NR" information element or an "sftdFrequencyList—EUTRA" information element. The "sftdCgiList" information element may be an "sftdCgiList-NR" information element or an "sftdCgiList-EUTRA" information element.

Based on the foregoing description, in the embodiment shown in FIG. 3, the master node sends a timing difference between cells and identification information of a non-primary cell (for example, the second cell in this embodiment of this application) corresponding to the timing difference to the secondary node, so that the secondary node can identify the non-primary cell corresponding to the timing difference.

Another embodiment of this application provides a method for transmitting a timing difference. The method includes: A master node sends an SFTD between a first cell and a second cell and identification information of the first cell to a secondary node.

Descriptions of the master node, the secondary node, the first cell, and the second cell are the same as the foregoing descriptions of the master node, the secondary node, the first cell, and the second cell, and details are not described herein again.

For example, the first cell is a primary cell (PCell) of the master node. The second cell is a primary secondary cell (PSCell) of the secondary node. Alternatively, the second cell is another cell. For example, the second cell is a secondary cell (SCell) of the secondary node. For another example, the second cell is a neighboring cell, and the neighboring cell is an LTE cell or an NR cell.

Identification information of the first cell represents information that can identify the first cell. For example, the identification information of the first cell is a cell identifier or a cell number of the first cell, or other information that can indicate the first cell.

For example, after receiving the timing difference and the identification information of the first cell from the master node, the secondary node may obtain, based on the identification information of the first cell, the primary cell (namely, the first cell in this embodiment) corresponding to the timing difference.

Optionally, a field may be added to the cell configuration information (CG-ConfigInfo) to carry the identification information of the first cell.

Optionally, the identification information of the first cell may be carried in an X2/Xn interface interaction message.

For example, the identification information of the first cell may be carried in any one of the following signaling: a secondary node (SN) addition message, a secondary node reconfiguration message, a secondary node modification message, or a secondary node release message.

In an example, an information element (IE) may be added to any one of the secondary node addition message, the secondary node reconfiguration message, the secondary node modification message, and the secondary node release message, and is used to carry the identification information of the first cell.

In this embodiment of this application, when the master node sends the SFTD between the first cell and the second cell to the secondary node, the master node further sends the identification information of the first cell to the secondary node, so that the secondary node can obtain the primary cell (that is, the first cell in this embodiment) corresponding to the timing difference.

After obtaining the primary cell corresponding to the SFTD, the secondary node may apply the SFTD to another terminal device. For example, the SFTD is applied to measurement gap configuration or discontinuous reception (DRX) configuration of another terminal device. The another terminal device described herein is different from the terminal device that is currently in dual-connectivity communication with the master node and the secondary node.

Optionally, in the embodiment shown in FIG. 3, the master node may further send identification information of the first cell to the secondary node.

For example, in step S310, the master node sends the SFTD between the first cell and the second cell, the identification information of the second cell, and the identification information of the first cell to the secondary node.

Another embodiment of this application further provides a method for measuring a timing difference. The method includes: The master node negotiates with a secondary node to configure timing difference measurement of a terminal device, to ensure that the terminal device performs at most one timing difference measurement task in a same period of time.

The master node may negotiate with the secondary node in a plurality of manners as long as the terminal device can perform at most one timing difference measurement task in a same period of time.

Figure 4:
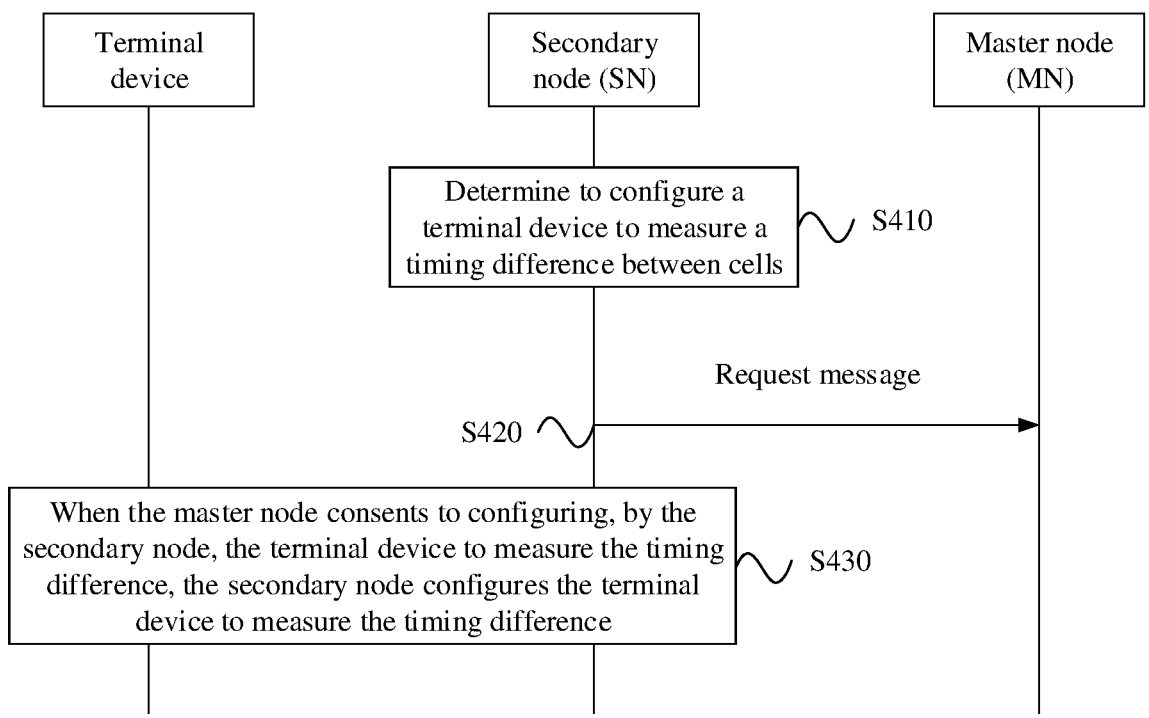
FIG. 4 is a schematic flowchart of a method for measuring a timing difference according to another embodiment of this application.

The following provides an example of a negotiation manner with reference to FIG. 4.

FIG. 4 is a schematic flowchart of a method for measuring a timing difference according to another embodiment of this application. The method includes the following steps.

S410: A secondary node (SN) determines to configure a terminal device to measure a timing difference between cells.

S420: The secondary node sends a request message to a master node (MN), to request to configure, by the secondary node, the terminal device to measure the timing difference between the cells.

S430: When the master node consents to configuring, by the secondary node, the terminal device to measure the timing difference, the secondary node configures the terminal device to measure the timing difference.

It should be understood that, when the master node does not consent, the secondary node does not configure the terminal device to measure the timing difference.

In this embodiment of this application, the secondary node may configure the terminal device to measure the timing difference between the cells.

In addition, the secondary node configures the terminal device to measure the timing difference in a manner of negotiating with the master node. The secondary node configures, when the master node consents, the terminal device to measure the timing difference between the cells. Therefore, in this application, in a dual-connectivity scenario, the master node and the secondary node can configure, in a negotiation manner, the terminal device to measure the SFTD, so that an SFTD measurement task configured for the terminal device can be prevented from exceeding a capability of the terminal device.

The timing difference between the cells in this embodiment of this application may be referred to as, for example, an SFTD. In the following, the timing difference between the cells is recorded as the SFTD for description.

In the embodiment shown in FIG. 4, the SFTD between the cells measured by the terminal device that the secondary node wants to configure may be any one of the following: an SFTD between a primary cell (PCell) of the master node and a primary secondary cell (PSCell) of the secondary node, an SFTD between a PCell and a neighboring cell, or an SFTD between a PSCell and a neighboring cell.

Optionally, the SFTD between the cells measured by the terminal device that the secondary node wants to configure may alternatively be an SFTD between a primary secondary cell (PSCell) and a secondary cell of the master node.

Step S430 may be implemented in various implementations.

Implementation 1:

When the master node consents to configuring, by the secondary node, the terminal device to measure the SFTD, the master node sends a response message used to indicate consent to the configuring to the secondary node. When the master node does not consent to configuring, by the secondary node, the terminal device to measure the SFTD, the master node sends a response message used to indicate dissent to the configuring to the secondary node.

Step S430 includes: When receiving the response message that is sent by the master node and that is used to indicate consent to the configuring, the secondary node configures the terminal device to measure the SFTD.

It should be understood that when receiving the response message that is sent by the master node and that is used to indicate dissent to the configuring, the secondary node does not configure the terminal device to measure the SFTD.

Implementation 2:

Only when the master node does not consent to configuring, by the secondary node, the terminal device to measure the SFTD, the master node sends a response message to the configuring to the secondary node. For example, the response message is used to indicate dissent to the configuring. When the master node consents to configuring, by the secondary node, the terminal device to measure the SFTD, the master node does not send a message to the secondary node.

Step S430 includes: When the response message that is sent by the master node for the request message is not received, the secondary node configures the terminal device to measure the SFTD.

It should be understood that when receiving the response message that is sent by the master node for the request message, the secondary node does not configure the terminal device to measure the SFTD.

Implementation 3:

Only when the master node consents to configuring, by the secondary node, the terminal device to measure the SFTD, the master node sends a response message to the secondary node. For example, the response message is used to indicate consent to the configuring. When the master node does not consent to configuring, by the secondary node, the terminal device to measure the SFTD, the master node does not send a message to the secondary node.

Step S430 includes: When receiving the response message that is sent by the master node for the request message, the secondary node configures the terminal device to measure the SFTD.

It should be understood that when the response message that is sent by the master node for the request message is not received, the secondary node does not configure the terminal device to measure the SFTD.

Optionally, in the embodiment shown in FIG. 4, the method may further include: The secondary node sends indication information to the master node, to indicate cells of an SFTD to be measured.

The indication information may include identification information of the cells of the SFTD to be measured.

Alternatively, the indication information may include a type of an SFTD, used to indirectly indicate the cells of the SFTD to be measured.

It is assumed that an SFTD between a PCell and a PSCell is recorded as a first-type SFTD, an SFTD between a PCell and a neighboring cell is recorded as a second-type SFTD, and an SFTD between a PSCell and a neighboring cell is recorded as a third-type SFTD. If the indication information indicates the first-type SFTD, it indicates that the cells of the SFTD to be measured are the PCell and the PSCell. If the indication information indicates the second-type SFTD, it indicates that the cells of the SFTD to be measured are the PCell and the neighboring cell.

The indication information may be carried in the request message in step S420. Alternatively, the indication information is not carried in the request message in step S420. For example, the indication information is sent through other signaling.

Optionally, the request message sent by the secondary node to the master node in step S420 further carries measurement configuration information of the SFTD, and the measurement configuration information of the SFTD includes identification information of the cells of the SFTD to be measured. The SFTD herein represents an SFTD that the secondary node requests the terminal device to measure.

For example, identification information that is of a cell of the SFTD to be measured and that is included in the measurement configuration information of the SFTD is a PCI and frequency information of the cell, or a CGI of the cell.

The master node may obtain, based on the request message sent by the secondary node, the cell corresponding to the SFTD that the secondary node requests to measure.

When receiving the request message of the secondary node, the master node may have obtained (or may indirectly obtain) a measurement result of the SFTD requested by the secondary node.

For example, the secondary node requests to configure the SFTD measured by the terminal device as an SFTD between a PSCell and another cell. When receiving the request message from the secondary node, the master node has obtained the SFTD between the PCell and the PSCell and the SFTD between the PCell and the another cell. The another cell herein is, for example, a neighboring cell. It should be understood that based on the SFTD between the PCell and the PSCell and the SFTD between the PCell and the another cell, the master node may obtain, through calculation, the SFTD between the PSCell and the another cell.

Optionally, when the master node has obtained the measurement result of the SFTD requested by the secondary node, the master node sends information used to indicate the measurement result of the SFTD to the secondary node. When receiving the information that is sent by the master node and that is used to indicate the measurement result of the SFTD, the secondary node does not configure the terminal device to measure the SFTD. This is equivalent to that the master node sends information used to indicate the measurement result of the SFTD to the secondary node, which implicitly indicates that the master node does not consent to configuring, by the secondary node, the terminal device to measure the SFTD.

For example, the SFTD that the secondary node requests to configure the terminal device to measure is an SFTD between a PSCell and another cell. Optionally, that the master node sends information used to indicate a measurement result of the SFTD to the secondary node includes: The master node sends the SFTD between the PCell and the another cell to the secondary node. The secondary node may obtain the SFTD between the PSCell and the another cell based on the SFTD between the PCell and the another cell that is sent by the master node.

Generally, the secondary node may locally store the SFTD between the PCell and the PSCell. For example, the secondary node obtains the SFTD between the PCell and the PSCell in a process of historical interaction between the secondary node and the master node. In this case, the secondary node may obtain, through calculation, the SFTD between the PSCell and the another cell based on the SFTD between the PCell and the another cell that is sent by the master node and the SFTD between the PCell and the PSCell that is locally stored.

Optionally, when sending the SFTD between the PCell and the another cell to the secondary node, the master node may further send the SFTD between the PCell and the PSCell. In this case, the secondary node may obtain, through calculation, the SFTD between the PSCell and the another cell based on the SFTD between the PCell and the another cell and the SFTD between the PCell and the PSCell that are sent by the master node.

Still for example, the SFTD that the secondary node requests to configure the terminal device to measure is an SFTD between a PSCell and another cell. Optionally, that the master node sends information used to indicate a measurement result of the SFTD to the secondary node includes: The master node directly sends the SFTD between the PSCell and the another cell to the secondary node.

The SFTD between the PSCell and the another cell may be obtained through calculation based on the SFTD between the PCell and the PSCell and the SFTD between the PCell and the another cell.

Optionally, when the master node has obtained the measurement result of the SFTD that the secondary node requests to configure the terminal device to measure, the master node may send a response message used to indicate dissent to the configuring to the secondary node. When receiving the response message used to indicate dissent to the configuring, the secondary node does not configure the terminal device to measure the SFTD.

Optionally, in the embodiment shown in FIG. 4, step S420 may be skipped.

For example, the master node may actively send an indication message indicating whether the master node consents to configuring, by the secondary node, the terminal device to measure the SFTD to the secondary node. In this case, the secondary node may determine, based on the indication message actively sent by the master node, whether to configure the terminal device to measure the SFTD, and may not send a request message to the master node, that is, step S420 is skipped.

For example, in the embodiment shown in FIG. 4, the configuring, by the secondary node, the terminal device to measure the SFTD includes: The secondary node sends measurement configuration information of the SFTD to the terminal device, where the measurement configuration information includes identification information of a cell of the SFTD to be measured. In other words, the measurement configuration information enables the terminal device to learn which cells between which the SFTD needs to be measured. The terminal device measures an SFTD between corresponding cells based on the measurement configuration information of the SFTD sent by the secondary node and reports a measurement result of the SFTD to the secondary node.

In the embodiment shown in FIG. 4, in a dual-connectivity scenario, the master node and the secondary node can configure, in a negotiation manner, the terminal device to measure the SFTD, so that an SFTD measurement task configured for the terminal device can be prevented from exceeding the capability of the terminal device.

In FIG. 4, a master node and a secondary node are used as an example for description. It should be understood that, in a multi-connectivity scenario including a plurality of secondary nodes, all the plurality of secondary nodes may negotiate with the master node, to ensure that the terminal device performs at most one timing difference measurement task in a same period of time.

Figure 5:
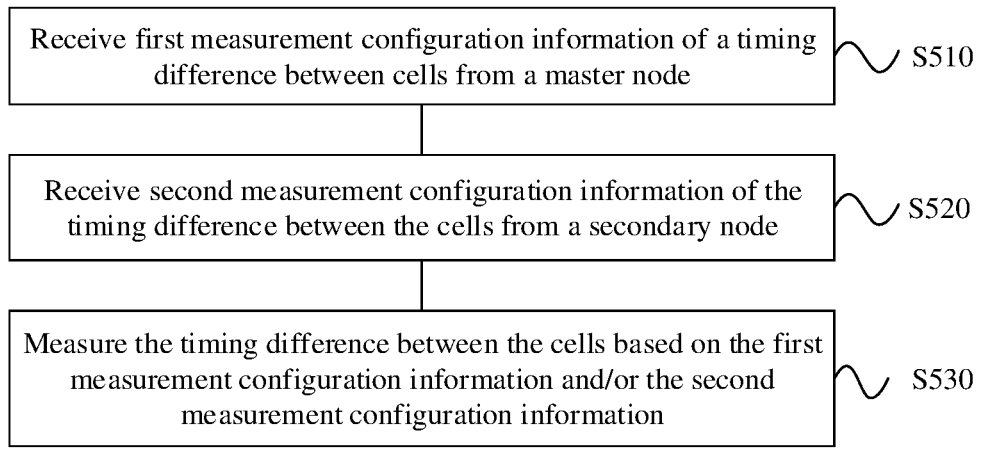
FIG. 5 is a schematic flowchart of a method for measuring a timing difference according to another embodiment of this application.

FIG. 5 is a schematic flowchart of a method for measuring a timing difference according to another embodiment of this application. The method is performed by a terminal device or a component (a chip or a circuit) that can be configured in the terminal device. The method includes the following steps.

S510: Receive first measurement configuration information of a timing difference between cells from a master node.

S520: Receive second measurement configuration information of a timing difference between the cells from the secondary node.

S530: Measure a timing difference between the cells based on the first measurement configuration information and/or the second measurement configuration information.

The timing difference between the cells in this embodiment of this application may be referred to as, for example, an SFTD. In the following, the timing difference between the cells is recorded as the SFTD for description.

It should be noted that there is no restriction on a strict sequence between step S510 and step S520.

Optionally, in step S530, the SFTD may be measured only based on the first measurement configuration information. In other words, the SFTD is not measured based on the second measurement configuration information, or the second measurement configuration information is ignored.

Optionally, in step S530, the SFTD may be measured only based on the second measurement configuration information. In other words, the SFTD is not measured based on the first measurement configuration information, or the first measurement configuration information is ignored.

Optionally, in step S530, the SFTD between the cells is first measured based on the first measurement configuration information, and after measuring of the SFTD between the cells based on the first measurement configuration information is completed, the SFTD between the cells is measured based on the second measurement configuration information.

Optionally, in step S530, the SFTD between the cells is first measured based on the second measurement configuration information, and after measuring of the SFTD between the cells based on the second measurement configuration information is completed, the SFTD between the cells is measured based on the first measurement configuration information.

In this embodiment of this application, an SFTD measurement task configured for the terminal device can be prevented from exceeding the capability of the terminal device.

The embodiments described in this specification may be independent solutions, or may be combined based on internal logic. These solutions all fall within the protection scope of this application.

It may be understood that the methods and operations implemented by the terminal device in the foregoing method embodiments may alternatively be implemented by a component (for example, a chip or a circuit) applicable to the terminal device, and the methods and operations implemented by the network device in the foregoing method embodiments may alternatively be implemented by a component (for example, a chip or a circuit) applicable to the network device.

The foregoing describes the method embodiments provided in this application, and the following describes apparatus embodiments provided in this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in this embodiment of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that, with reference to the examples described in the embodiments disclosed in this specification, units and algorithm steps may be implemented by hardware or a combination of computer software and hardware in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the protection scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, module division in the embodiments of this application is an example, and is merely logical functional division. In actual implementation, another feasible division manner may be available. The following provides descriptions by using the example in which division into functional modules is performed based on functions.

Figure 6:
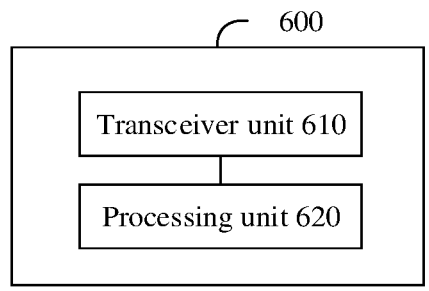
FIG. 6 is a schematic block diagram of a communications apparatus according to an embodiment of this application.

FIG. 6 is a schematic block diagram of a communications apparatus 600 according to an embodiment of this application. The communications apparatus 600 includes a transceiver unit 610 and a processing unit 620. The transceiver unit 610 may communicate with the outside, and the processing unit 620 is configured to process data. The transceiver unit 610 may also be referred to as a communications interface or a communications unit.

Optionally, the communications apparatus 600 may further include a storage unit. The storage unit may be configured to store instructions or data. The processing unit 620 may read the instructions or data in the storage unit.

The communications apparatus 600 may be configured to perform an action performed by the terminal device in the foregoing method embodiments. In this case, the communications apparatus 600 may be the terminal device or a component that can be configured in the terminal device. The transceiver unit 610 is configured to perform transceiver-related operations on a terminal device side in the foregoing method embodiments. The processing unit 620 is configured to perform processing-related operations on the terminal device side in the foregoing method embodiments.

Alternatively, the communications apparatus 600 may be configured to perform an action performed by the network device (the master node or the secondary node) in the foregoing method embodiments. In this case, the communications apparatus 600 may be the network device or a component that can be configured in the network device. The transceiver unit 610 is configured to perform transceiver-related operations on a network device side in the foregoing method embodiments. The processing unit 620 is configured to perform processing-related operations on the network device side in the foregoing method embodiments.

In a design, the communications apparatus 600 is configured to perform an action performed by the master node in the embodiment shown in FIG. 3. The processing unit 620 is configured to obtain a measurement value of a timing difference between a first cell and a second cell. The transceiver unit 610 is configured to send the measurement value of the timing difference and identification information of the second cell to a secondary node. The first cell is a primary cell of the master node, and the second cell is a primary secondary cell of the secondary node, or the second cell is another cell. The identification information of the second cell includes a PCI and frequency information of the second cell, or the identification information of the second cell includes a CGI of the second cell.

For example, the timing difference is an SFTD.

Optionally, the measurement value of the timing difference and the identification information of the second cell are carried in a same information element.

Optionally, when the identification information of the second cell includes the physical cell identifier (PCI) and the frequency information of the second cell, the measurement value of the timing difference and the PCI of the second cell are carried in a first information element, and the frequency information of the second cell is carried in a second information element. A location of the frequency information of the second cell in the second information element is in a one-to-one correspondence with a location of the measurement value of the timing difference or the PCI of the second cell in the first information element.

Optionally, when the identification information of the second cell includes the cell global identifier CGI of the second cell, the measurement value of the timing difference is carried in a first information element, and the CGI of the second cell is carried in a second information element. A location of the CGI of the second cell in the second information element is in a one-to-one correspondence with a location of the measurement value of the timing difference in the first information element.

In another design, the communications apparatus 600 is configured to perform an action performed by the secondary node in the embodiment shown in FIG. 3. The transceiver unit 610 is configured to receive, from a master node, a measurement value of a timing difference between a first cell and a second cell, and identification information of the second cell. The processing unit 620 is configured to obtain the timing difference between the first cell and the second cell. The first cell is a primary cell of the master node, the second cell is a primary secondary cell of a secondary node, or the second cell is another cell, and the identification information of the second cell includes a PCI and frequency information of the second cell, or the identification information of the second cell includes a CGI of the second cell.

For example, the timing difference is an SFTD.

Optionally, the measurement value of the timing difference and the identification information of the second cell are carried in a same information element.

Optionally, when the identification information of the second cell includes the physical cell identifier (PCI) and the frequency information of the second cell, the measurement value of the timing difference and the PCI of the second cell are carried in a first information element, and the frequency information of the second cell is carried in a second information element. A location of the frequency information of the second cell in the second information element is in a one-to-one correspondence with a location of the measurement value of the timing difference or the PCI of the second cell in the first information element.

Optionally, when the identification information of the second cell includes the cell global identifier CGI of the second cell, the measurement value of the timing difference is carried in a first information element, and the CGI of the second cell is carried in a second information element. A location of the CGI of the second cell in the second information element is in a one-to-one correspondence with a location of the measurement value of the timing difference in the first information element.

Optionally, the processing unit 620 is further configured to perform related processing based on the SFTD. For example, the SFTD may be used for DRX alignment or measurement gap identification.

In another design, the communications apparatus 600 is configured to perform an action performed by the secondary node in the embodiment shown in FIG. 4. The processing unit 620 is configured to: determine to configure a terminal device to measure a timing difference between cells, and if the master node consents, configure a terminal device to measure the timing difference.

For example, the timing difference is an SFTD.

Optionally, the transceiver unit 610 is configured to send a request message to the master node, to request to configure a terminal device to measure the timing difference. The processing unit 620 is configured to: when the transceiver unit 610 receives a response message that is sent by the master node and used to indicate consent to the configuring, configure the terminal device to measure the timing difference, or when the transceiver unit 610 does not receive the response message that is sent by the master node for the request message, configure the terminal device to measure the timing difference.

Optionally, the request message further carries measurement configuration information of the timing difference, and the measurement configuration information of the timing difference includes identification information of a cell corresponding to the timing difference, and the processing unit 620 is configured to: when the transceiver unit 610 receives information sent by the master node and used to indicate a measurement result of the timing difference, skip configuring, by the secondary node, a terminal device to measure the timing difference.

Optionally, the cells corresponding to the timing difference include a primary secondary cell of the secondary node and another cell. The information sent by the master node and used to indicate the measurement result of the timing difference includes: a timing difference between the primary cell and the another cell, or a timing difference between the primary secondary cell and the another cell.

Optionally, identification information of a cell corresponding to the timing difference includes a PCI and frequency information of the cell, or a CGI of the cell.

In another design, the communications apparatus 600 is configured to perform an action performed by the master node in the embodiment shown in FIG. 4. The transceiver unit 610 is configured to receive a request message from the secondary node, where the request message is used to request for configuring, by the secondary node, a terminal device to measure a timing difference between cells. The processing unit 620 is configured to determine, based on the request message, whether to consent to the configuring, by the secondary node, the terminal device to measure the timing difference. The transceiver unit 610 is further configured to send a response message used to indicate consent or dissent to the configuring to the secondary node.

For example, the timing difference is an SFTD.

Optionally, the request message further carries measurement configuration information of the timing difference, and the measurement configuration information of the timing difference includes identification information of a cell corresponding to the timing difference, and the transceiver unit 610 is further configured to send information used to indicate a measurement result of the timing difference to the secondary node, to express dissent to the configuring, by the secondary node, the terminal device to measure the timing difference.

Optionally, the cells corresponding to the timing difference include a primary secondary cell of the secondary node and another cell. The information sent by the master node and used to indicate the measurement result of the timing difference includes: a timing difference between the primary cell and the another cell, or a timing difference between the primary secondary cell and the another cell.

Optionally, identification information of a cell corresponding to the timing difference includes a PCI and frequency information of the cell, or a CGI of the cell.

In another design, the communications apparatus 600 is configured to perform an action performed by the terminal device in the embodiment shown in FIG. 4, or the method in the embodiment shown in FIG. 5. The transceiver unit 610 is configured to: receive first measurement configuration information of a timing difference between cells from a master node, and receive second measurement configuration information of the timing difference between the cells from a secondary node, and the processing unit 620 is configured to measure the timing difference between the cells based on the first measurement configuration information and/or the second measurement configuration information.

For example, the timing difference is an SFTD.

Optionally, the processing unit 620 is configured to: measure the timing difference between the cells based on the first measurement configuration information, measure the timing difference between the cells based on the second measurement configuration information, after measuring the timing difference between the cells based on the first measurement configuration information is completed, measure the timing difference between the cells based on the second measurement configuration information, or after measuring the timing difference between the cells based on the second measurement configuration information is completed, measure the timing difference between the cells based on the first measurement configuration information.

The processing unit 620 in the foregoing embodiment may be implemented by a processor or a processor-related circuit. The transceiver unit 610 may be implemented by a transceiver or a transceiver-related circuit. The transceiver unit 610 may also be referred to as a communications unit or a communications interface. The storage unit may be implemented by a memory.

Figure 7:
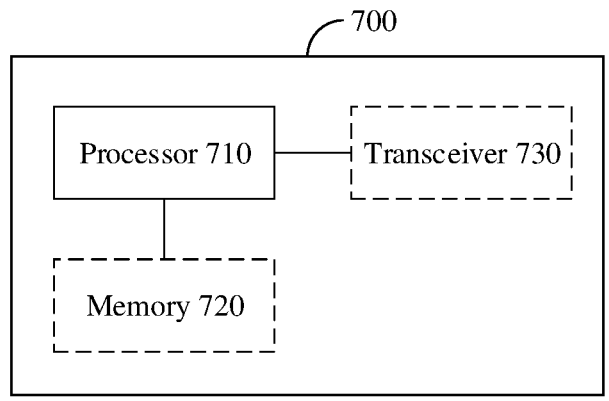
FIG. 7 is a schematic block diagram of another communications apparatus according to an embodiment of this application.

As shown in FIG. 7, an embodiment of this application further provides a communications apparatus 700. The communications apparatus 700 includes a processor 710. The processor 710 is coupled to a memory 720. The memory 720 is configured to store a computer program or instructions or data. The processor 710 is configured to execute the computer program or the instructions or data stored in the memory 720, so that the method in the foregoing method embodiments is performed.

Optionally, the communications apparatus 700 includes one or more processors 710.

Optionally, as shown in FIG. 7, the communications apparatus 700 may further include the memory 720.

Optionally, the communications apparatus 700 may include one or more memories 720.

Optionally, the memory 720 and the processor 710 may be integrated together, or disposed separately.

Optionally, as shown in FIG. 7, the communications apparatus 700 may further include a transceiver 730, and the transceiver 730 is configured to receive and/or send a signal. For example, the processor 710 is configured to control the transceiver 730 to receive and/or send a signal.

In a solution, the communications apparatus 700 is configured to implement an operation performed by the terminal device in the foregoing method embodiments.

For example, the processor 710 is configured to implement a processing-related operation performed by the terminal device in the foregoing method embodiments, and the transceiver 730 is configured to implement a transceiver-related operation performed by the terminal device in the foregoing method embodiments.

In another solution, the communications apparatus 700 is configured to implement an operation performed by the network device (the master node or the secondary node) in the foregoing method embodiments.

For example, the processor 710 is configured to implement a processing-related operation performed by the network device in the foregoing method embodiments, and the transceiver 730 is configured to implement a transceiver-related operation performed by the network device in the foregoing method embodiments.

An embodiment of this application further provides a communications apparatus 800. The communications apparatus 800 may be a terminal device or a chip. The communications apparatus 800 may be configured to perform an operation performed by the terminal device in the foregoing method embodiments.

Figure 8:
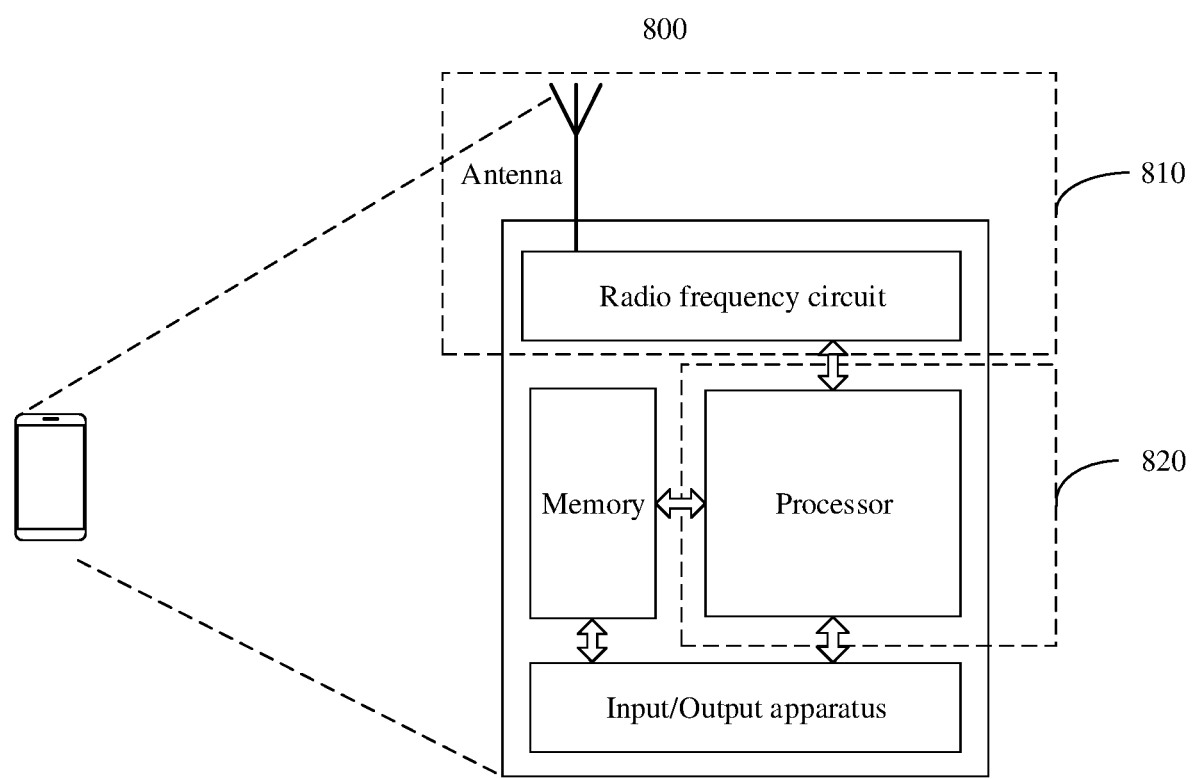
FIG. 8 is a schematic block diagram of a terminal device according to an embodiment of this application.

When the communications apparatus 800 is a terminal device, FIG. 8 is a simplified schematic diagram of a structure of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communications protocol and communications data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data input by a user and output data to the user. It should be noted that some types of terminal devices may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 8, the terminal device includes a transceiver unit 810 and a processing unit 820. The transceiver unit 810 may also be referred to as a transceiver, a transceiver apparatus, or the like. The processing unit 820 may also be referred to as a processor, a processing board, a processing module, a processing apparatus, or the like.

Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit sometimes may also be referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

For example, in an implementation, the processing unit 820 is configured to perform a processing action on a terminal device side in FIG. 4, for example, perform SFTD measurement based on measurement configuration information sent by the secondary node. The transceiver unit 810 is configured to perform the operation of receiving, by the terminal device, the measurement configuration information of the SFTD from the secondary node in FIG. 4.

For example, in an implementation, the processing unit 820 is configured to perform step S530 in FIG. 5. The transceiver unit 810 is configured to perform the receiving operations in step S510 and step S520 in FIG. 5.

It should be understood that FIG. 8 is merely an example instead of a limitation. The terminal device including the transceiver unit and the processing unit may not depend on the structure shown in FIG. 8.

When the communications apparatus 800 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications apparatus 900. The communications apparatus 900 may be a network device or a chip. The communications apparatus 900 may be configured to perform an operation performed by the network device (the master node or the secondary node) in the foregoing method embodiments.

Figure 9:
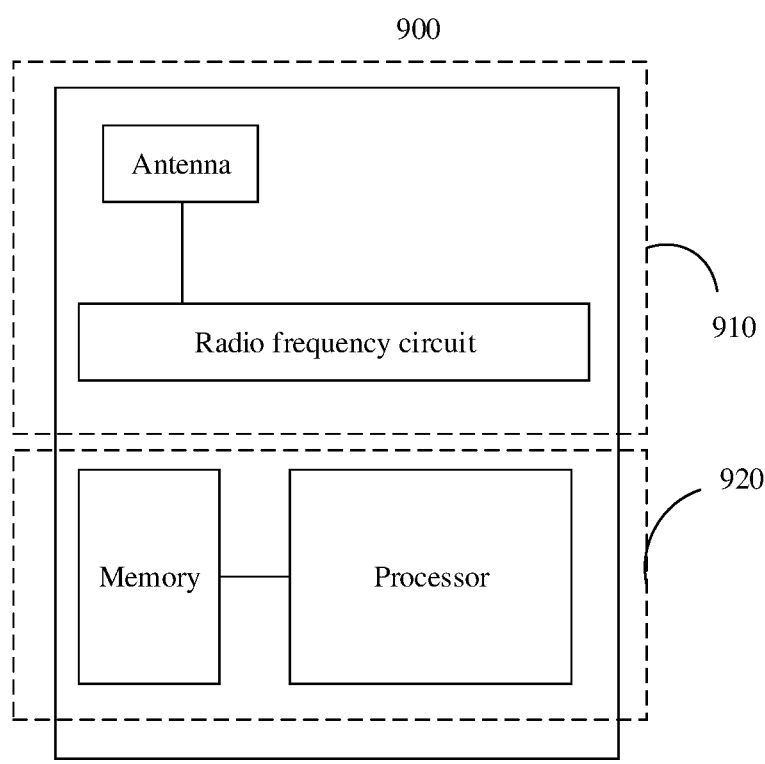
FIG. 9 is a schematic block diagram of a network device according to an embodiment of this application.

When the communications apparatus 900 is a network device, for example, a base station, FIG. 9 is a simplified schematic diagram of a structure of the base station. The base station includes a part 910 and a part 920. The part 910 is mainly configured to: send and receive a radio frequency signal, and perform conversion between the radio frequency signal and a baseband signal. The part 920 is mainly configured to: perform baseband processing, control the base station, and the like. The part 910 may be usually referred to as a transceiver unit, a transceiver, a transceiver circuit, a transceiver, or the like. The part 920 is usually a control center of the base station, may be usually referred to as a processing unit, and is configured to control the base station to perform a processing operation on a network device side in the foregoing method embodiments.

The transceiver unit in the part 910 may also be referred to as a transceiver, a transceiver machine, or the like, and includes an antenna and a radio frequency circuit. The radio frequency circuit is mainly configured to perform radio frequency processing. Optionally, a component that is of the part 910 and that is configured to implement a receiving function may be considered as a receiving unit, and a component that is configured to implement a sending function may be considered as a sending unit. In other words, the part 910 includes the receiving unit and the sending unit. The receiving unit may also be referred to as a receiver, a receiver, a receiver circuit, or the like, and the sending unit may be referred to as a transmitter, a transmitter, a transmitter circuit, or the like.

The part 920 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the network device is the master node, and the transceiver unit in the part 910 is configured to perform the sending operation in step S320 in FIG. 3, and/or the transceiver unit in the part 910 is further configured to perform the other transceiver-related steps performed by the master node in the embodiment shown in FIG. 3. The part 920 is configured to perform step S310 in FIG. 3, and/or the part 920 is further configured to perform the processing-related steps performed by the master node in the embodiment shown in FIG. 3.

For example, in yet another implementation, the network device is the master node, and the transceiver unit in the part 910 is configured to perform the receiving operation in step S420 in FIG. 4, and/or the transceiver unit in the part 910 is further configured to perform the other transceiver-related steps performed by the master node in the embodiment shown in FIG. 4. For example, the master node sends a response message for the request message to the secondary node. The part 920 is configured to perform the processing-related steps performed by the master node in the embodiment shown in FIG. 4.

For example, in still another implementation, the network device is the master node, and the transceiver unit in the part 910 is configured to perform the sending operation in step S510 in FIG. 5. The part 920 is configured to perform the processing-related steps performed by the master node in the embodiment shown in FIG. 5, for example, generate, for the terminal device, first measurement configuration information used to measure the SFTD.

For example, in still another implementation, the network device is the secondary node, and the transceiver unit in the part 910 is configured to perform the receiving operation in step S320 in FIG. 3, and/or the transceiver unit in the part 910 is further configured to perform the other transceiver-related steps performed by the secondary node in the embodiment shown in FIG. 3. The part 920 is configured to perform the processing-related steps performed by the secondary node in the embodiment shown in FIG. 3, for example, obtain the timing difference between the first cell and the second cell based on the information received from the master node.

For example, in still another implementation, the network device is the secondary node, and the transceiver unit in the part 910 is configured to perform the sending operation in step S420 in FIG. 4 and the sending operation of the secondary node in step S430 (for example, sending measurement configuration information of the SFTD to the terminal device), and/or the transceiver unit in the part 910 is further configured to perform the other transceiver-related steps performed by the secondary node in the embodiment shown in FIG. 4. The part 920 is configured to perform step S410 in FIG. 4, and/or the processing unit in the part 920 is further configured to perform the processing-related steps performed by the secondary node in the embodiment shown in FIG. 4.

For example, in still another implementation, the network device is the secondary node, and the transceiver unit in the part 910 is configured to perform the sending operation in step S520 in FIG. 5. The part 920 is configured to perform the processing-related steps performed by the secondary node in the embodiment shown in FIG. 5, for example, generate, for the terminal device, second measurement configuration information used to measure the SFTD.

It should be understood that FIG. 9 is merely an example instead of a limitation. The network device including the transceiver unit and the processing unit may not depend on the structure shown in FIG. 9.

When the communications apparatus 900 is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a computer-readable storage medium, and the computer-readable storage medium stores computer instructions used to implement the method performed by the terminal device or the method performed by the network device (the master node or the secondary node) in the foregoing method embodiments.

For example, when the computer program is executed by a computer, the computer is enabled to implement the method performed by the terminal device or the method performed by the network device (the master node or the secondary node) in the foregoing method embodiments.

An embodiment of this application further provides a computer program product including instructions. When the instructions are executed by a computer, the computer is enabled to implement the method performed by the terminal device or the method performed by the network device (the master node or the secondary node) in the foregoing method embodiments.

An embodiment of this application further provides a communications system. The communications system includes the master node, the secondary node, and the terminal device in the foregoing embodiments. The terminal device may establish radio links with the master node and the secondary node by using a dual-connectivity technology.

In an example, the communications system includes the secondary node, the master node, and the terminal device in the embodiment described above with reference to FIG. 3.

In another example, the communications system includes the secondary node, the master node, and the terminal device in the embodiment described above with reference to FIG. 4.

In still another example, the communications system includes the secondary node, the master node, and the terminal device in the embodiment described above with reference to FIG. 5.

For explanations and beneficial effects of related content in any of the foregoing provided communications apparatuses, refer to corresponding method embodiments provided above. Details are not described herein again.

In the embodiments of this application, the terminal device or the network device includes a hardware layer, an operating system layer running above the hardware layer, and an application layer running above the operating system layer. The hardware layer may include hardware such as a central processing unit (CPU), a memory management unit (MMU), and a memory (which is also referred to as a main memory). An operating system of the operating system layer may be any one or more of computer operating systems implementing service processing by using a process, for example, a Linux operating system, a Unix operating system, an Android operating system, an iOS operating system, or a Windows operating system. The application layer may include applications such as a browser, an address book, word processing software, and instant communications software.

A specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by a terminal device or a network device, or may be performed by a functional module that is in the terminal device or the network device and that can invoke and execute a program.

Aspects or features of this application may be implemented as a method, an apparatus or a product that uses standard programming and/or engineering technologies. As used herein, the term "product" may cover a computer program that is accessible from any computer-readable device, carrier, or medium. For example, a computer-readable medium may include but is not limited to: a magnetic storage device (for example, a hard disk, a floppy disk or a magnetic tape), an optical disc (for example, a compact disc (CD) or a digital versatile disc (DVD)), a smart card, and a flash memory device (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel, and various other media that can store, contain, and/or carry instructions and/or data.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It should be further understood that the memory in the embodiments of this application may be a volatile memory, or a non-volatile memory, or may include both a volatile memory and a non-volatile memory. The non-volatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example and not limitation, the RAM may include a plurality of forms in the following: static random access memory (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronously connected dynamic random access memory (synchlink DRAM, SLDRAM), and a direct memory bus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (storage module) may be integrated into the processor.

It should also be noted that the memories described herein are intended to include, but are not limited to, these and any other suitable types of memories.

A person of ordinary skill in the art may be aware that, with reference to the examples described in the embodiments disclosed in this specification, units and steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing apparatus and unit, refer to a corresponding process in the foregoing method embodiments. Details are not described herein.

In the several embodiments provided in this application, it should be understood that the disclosed apparatus and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate parts may or may not be physically separate. Parts displayed as units may or may not be physical units, to be specific, may be located in one position, or may be distributed on a plurality of network units. Some or all of the units may be selected based on an actual requirement to achieve an objective of the solutions of the embodiments.

In addition, functional units in the embodiments of this application may be integrated into one unit, or each of the units may exist alone physically, or two or more units are integrated into one unit.

All or a part of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the foregoing usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a timing difference, comprising:
   obtaining, by a master node, a measurement value of a timing difference between a first cell and a second cell; and
   sending, by the master node, the measurement value of the timing difference and identification information of the second cell to a secondary node;
   wherein the first cell is a primary cell corresponding to the master node, wherein the second cell comprises at least one of a primary secondary cell corresponding to the secondary node or another cell different from the primary secondary cell, and wherein the identification information of the second cell comprises a physical cell identifier (PCI) and frequency information of the second cell; and wherein the measurement value of the timing difference and the PCI of the second cell are carried in a first information element, wherein frequency information of the second cell is carried in a second information element, and wherein a location of the frequency information of the second cell in the second information element is in a one-to-one correspondence with a location of at least one of the measurement value of the timing difference or the PCI of the second cell in the first information element.

2. The method according to claim 1, wherein the measurement value of the timing difference and the identification information of the second cell are carried in a same information element.

3. The method according to claim 1, wherein the timing difference is a system frame number and frame timing difference (SFTD).

4. The method according to claim 1, wherein the identification information of the second cell further comprises a cell global identifier (CGI) of the second cell.

5. The method according to claim 1, wherein the sending the measurement value of the timing difference and identification information of the second cell to the secondary node causes the secondary node to identify the second cell corresponding to the timing difference.

6. A method for transmitting a timing difference, comprising:
receiving, by a secondary node, a measurement value of a timing difference between a first cell and a second cell, and identification information of the second cell from a master node; and
obtaining, by the secondary node, the timing difference between the first cell and the second cell;
wherein the first cell is a primary cell corresponding to the master node, wherein the second cell comprises at least one of a primary secondary cell corresponding to the secondary node or another cell different from the primary secondary cell, and wherein the identification information of the second cell comprises a physical cell identifier (PCI) and frequency information of the second cell; and
wherein the measurement value of the timing difference and the PCI of the second cell are carried in a first information element, wherein the frequency information of the second cell is carried in a second information element, and wherein a location of the frequency information of the second cell in the second information element is in a one-to-one correspondence with a location of at least one of the measurement value of the timing difference or the PCI of the second cell in the first information element.

7. The method according to claim 6, wherein the measurement value of the timing difference and the identification information of the second cell are carried in a same information element.

8. The method according to claim 6, wherein the timing difference is a system frame number and frame timing difference (SFTD).

9. The method according to claim 6, wherein the identification information of the second cell further comprises a cell global identifier (CGI) of the second cell.

10. The method according to claim 6, further comprising identifying, by the secondary node, the second cell corresponding to the timing difference.

11. A communications system, comprising:
a master node in communication with a secondary node, wherein the master node is configured to:
obtain a measurement value of a timing difference between a first cell and a second cell; and
send the measurement value of the timing difference and identification information of the second cell to the secondary node, wherein the timing difference and identification information of the second cell identify, to the secondary node, the timing difference and the second cell corresponding to the timing difference;
wherein the first cell is a primary cell corresponding to a master node, wherein the second cell comprises at least one of a primary secondary cell corresponding to the secondary node or another cell different from the primary secondary cell, and wherein the identification information of the second cell comprises a physical cell identifier (PCI) and frequency information of the second cell; and
wherein the measurement value of the timing difference and the PCI of the second cell are carried in a first information element, wherein the frequency information of the second cell is carried in a second information element, and wherein a location of the frequency information of the second cell in the second information element is in a one-to-one correspondence with a location of at least one of the measurement value of the timing difference or the PCI of the second cell in the first information element.

12. The system according to claim 11, wherein the measurement value of the timing difference and the identification information of the second cell are carried in a same information element.

13. The system according to claim 11, wherein the timing difference is a system frame number and frame timing difference (SFTD).

14. The system according to claim 11, further comprising the secondary node, wherein the secondary node is configured to:
receive a measurement value of a timing difference between a first cell and a second cell and identification information of the second cell from a master node; and
obtain a timing difference between a first cell and a second cell.

15. The system according to claim 11, further comprising a terminal device, wherein the terminal device is configured to send a measurement value of a timing difference between a first cell and a second cell to the master node.

16. The system according to claim 11, wherein the identification information of the second cell further comprises a cell global identifier (CGI) of the second cell.

17. The system according to claim 11, wherein the master node sending the measurement value of the timing difference and identification information of the second cell to the secondary node causes the secondary node to identify the second cell corresponding to the timing difference.

* * * * *